US012726975B2

(12) United States Patent
Shi et al.

(10) Patent No.: US 12,726,975 B2
(45) Date of Patent: Sep. 1, 2026

(54) EFFICIENT MULTI-CELL SCHEDULING MECHANISM

(71) Applicant: ZTE Corporation, Shenzhen (CN)

(72) Inventors: Jing Shi, Shenzhen (CN); Xianghui Han, Shenzhen (CN); Shuaihua Kou, Shenzhen (CN); Xingguang Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 276 days.

(21) Appl. No.: 18/421,703

(22) Filed: Jan. 24, 2024

(65) Prior Publication Data

US 2024/0188070 A1 Jun. 6, 2024

Related U.S. Application Data

(63) Continuation of application No. PCT/CN2022/090036, filed on Apr. 28, 2022.

(51) Int. Cl.
*H04W 72/1263* (2023.01)
*H04L 5/00* (2006.01)
*H04W 72/232* (2023.01)

(52) U.S. Cl.
CPC ....... *H04W 72/1263* (2013.01); *H04L 5/0053* (2013.01); *H04W 72/232* (2023.01)

(58) Field of Classification Search
CPC ........... H04W 72/1263; H04W 72/232; H04W 72/23; H04L 5/0053; H04L 5/0094; H04L 5/001
See application file for complete search history.

(56) References Cited

U.S. PATENT DOCUMENTS 11,888,610 B2 * 1/2024 Kumar .................. H04W 64/00
2021/0266095 A1 * 8/2021 Kumar .................. H04L 5/0032
(Continued)

FOREIGN PATENT DOCUMENTS

CN 111245586 A 6/2020
CN 113285788 A 8/2021
(Continued)

OTHER PUBLICATIONS

Japanese-language Office Action issued in JP Patent No. 2024-505572, mailing date Feb. 25, 2025, with English translation (9 pages).
(Continued)

*Primary Examiner* — Habte Mered
(74) *Attorney, Agent, or Firm* — Crowell & Moring LLP

(57) ABSTRACT

This disclosure is directed to resource scheduling/signaling in a wireless cellular access network and is specifically directed to a mechanism for resource scheduling in a multi-cell and carrier aggregation environment for a User Equipment (UE) by a wireless base station with enhanced scheduling efficiency. The various example embodiments are particularly directed to multi-cell downlink resource scheduling/signaling by the base station and blind monitoring of the corresponding scheduling/signaling messages by a wireless terminal device. The general mechanism includes using a single Downlink Control Information (DCI) message to schedule resources for multiple cells for the UE. In addition, the mechanism includes using any one of the multiple cells as a scheduling cell to carry the single DCI message by the base station. Various schemes are implemented such that a maximum number of blind decoding by the UE to monitor the scheduling DCI is not increased over a normal single-cell scheduling scheme.

20 Claims, 13 Drawing Sheets

(56) References Cited

U.S. PATENT DOCUMENTS

| | | | | |
|---|---|---|---|---|
| 2021/0377996 | A1 | 12/2021 | Lee | |
| 2022/0312452 | A1* | 9/2022 | Frenne | H04L 5/005 |
| 2022/0360998 | A1* | 11/2022 | Park | H04L 5/005 |
| 2023/0081776 | A1* | 3/2023 | Kim | H04L 5/0053 370/329 |
| 2023/0318786 | A1* | 10/2023 | Takeda | H04L 5/0078 370/329 |
| 2023/0354391 | A1* | 11/2023 | Babaei | H04L 5/0053 |
| 2024/0080132 | A1* | 3/2024 | Atawia | H04L 5/0094 |

FOREIGN PATENT DOCUMENTS

| | | | |
|---|---|---|---|
| CN | 114245973 | A | 3/2022 |
| KR | 10-2021-0075725 | A | 6/2021 |
| WO | 2021/173348 | A1 | 9/2021 |

OTHER PUBLICATIONS

Ericsson; "On DSS Enhancements in Rel-18," 3GPP TSG RAN #94e, RP-212946, Internet <URL:https://www.3gpp.org/ftp/tsg_ran/TSG_RAN/TSGR_94e/Docs/RP-212946.zip>, dated Dec. 6-17, 2021 (8 pages).

Ericsson; "New WI: Enhancement of NR Dynamic Spectrum Sharing (DSS)," 3GPP TSG RAN #94e, RP-213575, Internet <URL:https://www.3gpp.org/ftp/tsg_ran/TSG_RAN/TSGR_94e/Docs/RP-213575.zip>, dated Dec. 6-17, 2021 (4 pages).

ZTE, China Telecom, Discussion on Rel-18 Nr Dss enhancement, 3GPP TSG RAN #94e, RP-213392, Internet <URL:https://www.3gpp.org/ftp/tsg_ran/TSG_RAN/TSGR_94e/Docs/RP-213392.zip>, dated Dec. 6-17, 2021 (3 pages).

Supplementary European Search Report, Jun. 27, 2024, pp. 1-8, Issued in European Patent Application No. 22939126.3, European Patent Office, The Hague, The Netherlands.

Japanese-language Office Action issued in Japanese Application No. 2024-505572 dated Aug. 15, 2025, with English translation (8 pages).

Apple Inc.; "Views on Rel-17 DSS SCell Scheduling PCell"; 3GPP TSG RAN WG1 #106b-e, e-Meeting; R1-2110059; Oct. 11-19, 2021; 6 pages.

Huawei, HiSilicon; "Discussion on SCell PDCCH Scheduling P(S)Cell PDSCH or PUSCH"; 3GPP TSG RAN WG1 Meeting #106-bis-e; e-Meeting; R1-2108773; Oct. 11-19, 2021; 14 pages.

Lenovo, Motorola Mobility; "Cross-carrier scheduling (from Scell to Pcell)"; 3GPP TSG RAN WG1 #106bis-e; e-Meeting, R1-2109938; Oct. 11-19, 2021; 4 pages.

NEC; "Multi-cell PDSCH scheduling via a single DCI"; 3GPP TSG RAN WG1#105-e; e-Meeting; R1-2105412; May 19-May 27, 2021; 4 pages.

Spreadtrum Communications; "Discussion on enhancements for unlicensed band URLLCIIoT"; 3GPP TSG RAN WG1 #103-e; e-Meeting; R1-2008108; Oct. 26-Nov. 13, 2020; 5 pages.

ZTE; "Discussion on Multi-cell PDSCH Scheduling via a Single DCI"; 3GPP TSG RAN WG1 #105-e; e-Meeting; R1-2104341; May 10-27, 2021; 22 pages.

International Search Report mailed December 16, 2022 for International Application No. PCT/CN2022/090036.

Written Opinion mailed December 16, 2022 for International Application No. PCT/CN2022/090036.

Japanese-language Office Action issued in Japanese Application No. 2024-505572 dated Feb. 13, 2026 with English translation (7 pages).

Ericsson, "Motivation for DSS enhancements in Rel-18", 3GPP TSG RAN Meeting #93-e Electronic Meeting, RP-212420, Sep. 2021, pp. 1-7 (8 pages).

* cited by examiner

EFFICIENT MULTI-CELL SCHEDULING MECHANISM

CROSS REFERENCE

This application is a continuation of and claims priority to International Patent Application No. PCT/CN2022/090036, filed on Apr. 28, 2022, which is herein incorporated by reference in its entirety.

TECHNICAL FIELD

This disclosure generally relates to resource scheduling in wireless cellular access network and is specifically directed to a mechanism for resource scheduling in a multi-cell environment.

BACKGROUND

In a cellular network, wireless communication resources for a wireless terminal to receive or transmit data or control information may be scheduled by a base station using downlink control information. In a multi-cell and carrier aggregation environment, wireless communication resources with respect to more than one cell may need to be scheduled for the wireless terminal. In designing a resource scheduling scheme based on downlink control information, a signaling efficiency from the base station standpoint and complexity in monitoring/handling the downlink control messages from the wireless terminal standpoint should be both taken into consideration.

SUMMARY

This disclosure relates to resource scheduling/signaling in a wireless cellular access network and is specifically directed to a mechanism for resource scheduling in a multi-cell and carrier aggregation environment. The various example embodiments are particularly directed to multi-cell downlink resource scheduling/signaling by a base station and monitoring of the corresponding scheduling/signaling messages by a wireless terminal device.

In some exemplary implementations, a method for receiving a Downlink Control Information (DCI) carried by a PDCCH by a wireless terminal device configured with a plurality of serving cells is disclosed. The method may include receiving a configuration of a set of scheduling cells for a scheduled cell, the set of scheduling cells comprising at least two of the plurality of serving cells, and performing blind decoding (BD) of PDCCH on the set of scheduling cells; wherein the DCI is used for scheduling a set of scheduled cells, the set of scheduled cells comprising at least two of the plurality of serving cells.

In some implementations, method for transmitting a Downlink Control Information (DCI) carried by a PDCCH by a network node for configuring a plurality of serving cells for a terminal device is disclosed. The method includes configuring a set of scheduling cells for scheduling a set of scheduled cells of the terminal device, the set of scheduling cells comprising at least two of the plurality of serving cells, and the set of scheduled cells comprising at least two of the plurality of serving cells, and transmitting the DCI on the set of scheduling cells; wherein the DCI is used for scheduling the set of scheduled cells.

In some other implementations, a network device is disclosed. The network device main include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above embodiments and other aspects and alternatives of their implementations are explained in greater detail in the drawings, the descriptions, and the claims below.

DETAILED DESCRIPTION

The technology and examples of implementations and/or embodiments described in this disclosure can be used to facilitate over-the-air radio resource allocation, configuration, and signaling in wireless access networks. The term "exemplary" is used to mean "an example of" and unless otherwise stated, does not imply an ideal or preferred example, implementation, or embodiment. Section headers are used in the present disclosure to facilitate understanding of the disclosed implementations and are not intended to limit the disclosed technology in the sections only to the corresponding section. The disclosed implementations may be further embodied in a variety of different forms and, therefore, the scope of this disclosure or claimed subject matter is intended to be construed as not being limited to any of the embodiments set forth below. The various implementations may be embodied as methods, devices, components, systems, or non-transitory computer readable media. Accordingly, embodiments of this disclosure may, for example, take the form of hardware, software, firmware or any combination thereof.

This disclosure is directed to resource scheduling/signaling in a wireless cellular access network and is specifically directed to a mechanism for resource scheduling in a multi-cell and carrier aggregation environment for a User Equipment (UE) by a wireless base station. The various example embodiments are particularly directed to multi-cell downlink resource scheduling/signaling by the base station and blind monitoring of the corresponding scheduling/signaling messages by a wireless terminal device. The general mechanism includes using a single Downlink Control Information (DCI) message to schedule resources for multiple cells for the UE. In addition, the mechanism includes using any one of the multiple cells as a scheduling cell to carry the DCI message by the base station. Various schemes are implemented such that a maximum number of blind decoding by the UE to monitor the scheduling DCI is not increased over a normal single-cell scheduling scheme. The disclosed resource scheduling mechanism in the multi-cell and carrier aggregation environment thus provides enhanced signaling efficiency by reducing the number of scheduling DCI messages and improved flexibility for the base station to configure the scheduling DCI messages, while avoiding burdening the UE with excess blind monitoring of the DCI message.

Wireless Network Overview

Figure 1:
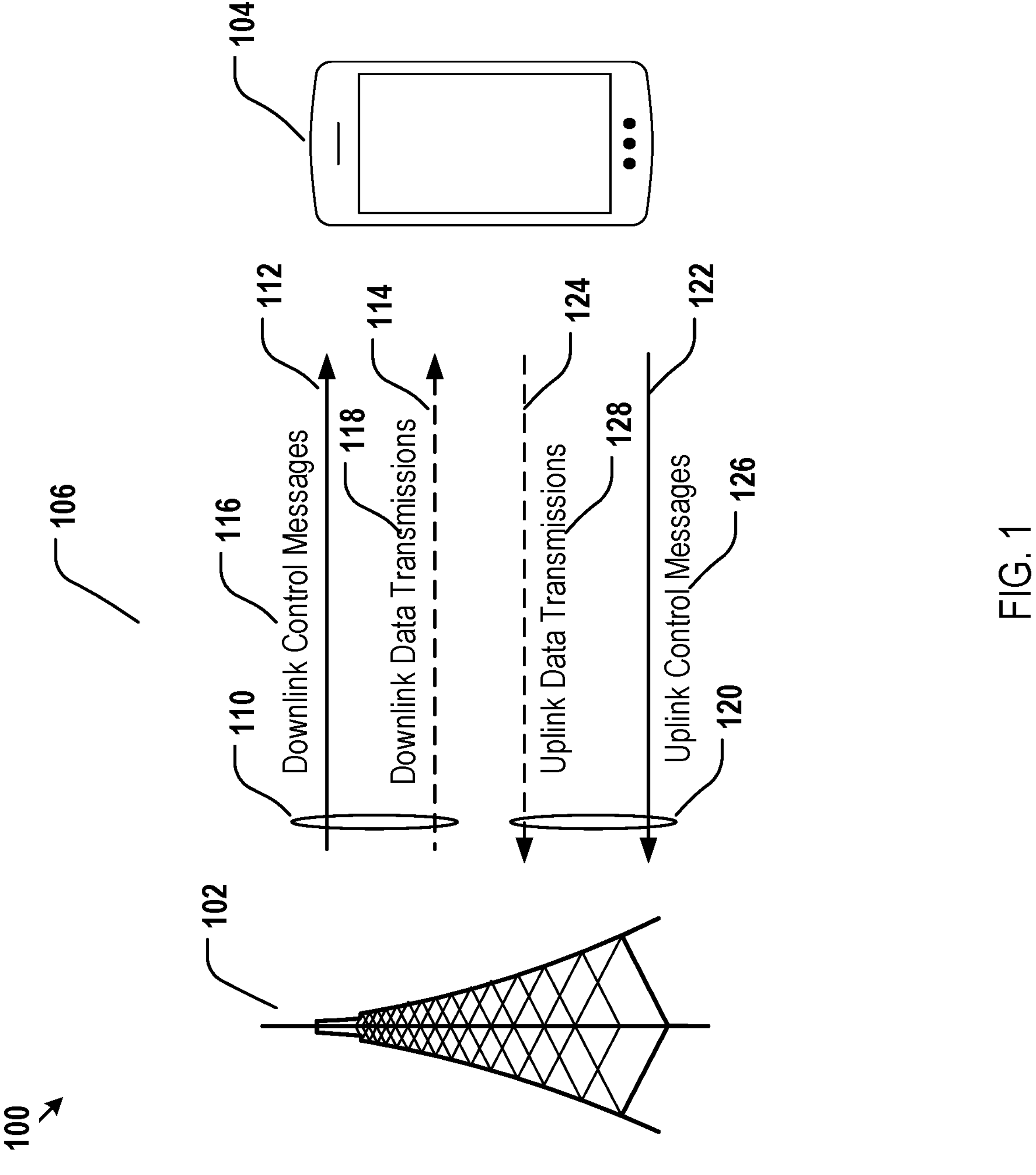
FIG. 1 shows a wireless access network with an exemplary uplink, downlink, and control channel configuration.

A wireless communication network may include a radio access network for providing network access to wireless terminal devices, and a core network for routing data between the access networks or between the wireless network and other types of data networks. In a wireless access network, radio resources are provided for allocation and used for transmitting data and control information. FIG. 1 shows an exemplary wireless access network 100 including a wireless access network node or wireless base station 102 (herein referred to as wireless base station, or base station) and a wireless terminal device or user equipment (UE) 104 (herein referred to as user equipment or UE) that communicates with one another via over-the-air (OTA) radio communication resources 106. The wireless access network 100 may be implemented as, as for example, a 2G, 3G, 4G/LTE, or 5G cellular radio access network. Correspondingly, the base station 102 may be implemented as a 2G base station, a 3G node B, an LTE eNB, or a 5G New Radio (NR) gNB. The user equipment 104 may be implemented as mobile or fixed communication devices installed with mobile identity modules for accessing the base station 102. The user equipment 104 may include but is not limited to mobile phones, laptop computers, tablets, personal digital assistants, wearable devices, distributed remote sensor devices, and desktop computers. Alternatively, the wireless access network 100 may be implemented as other types of radio access networks, such as Wi-Fi, Bluetooth, ZigBee, and WiMax networks.

Figure 2:
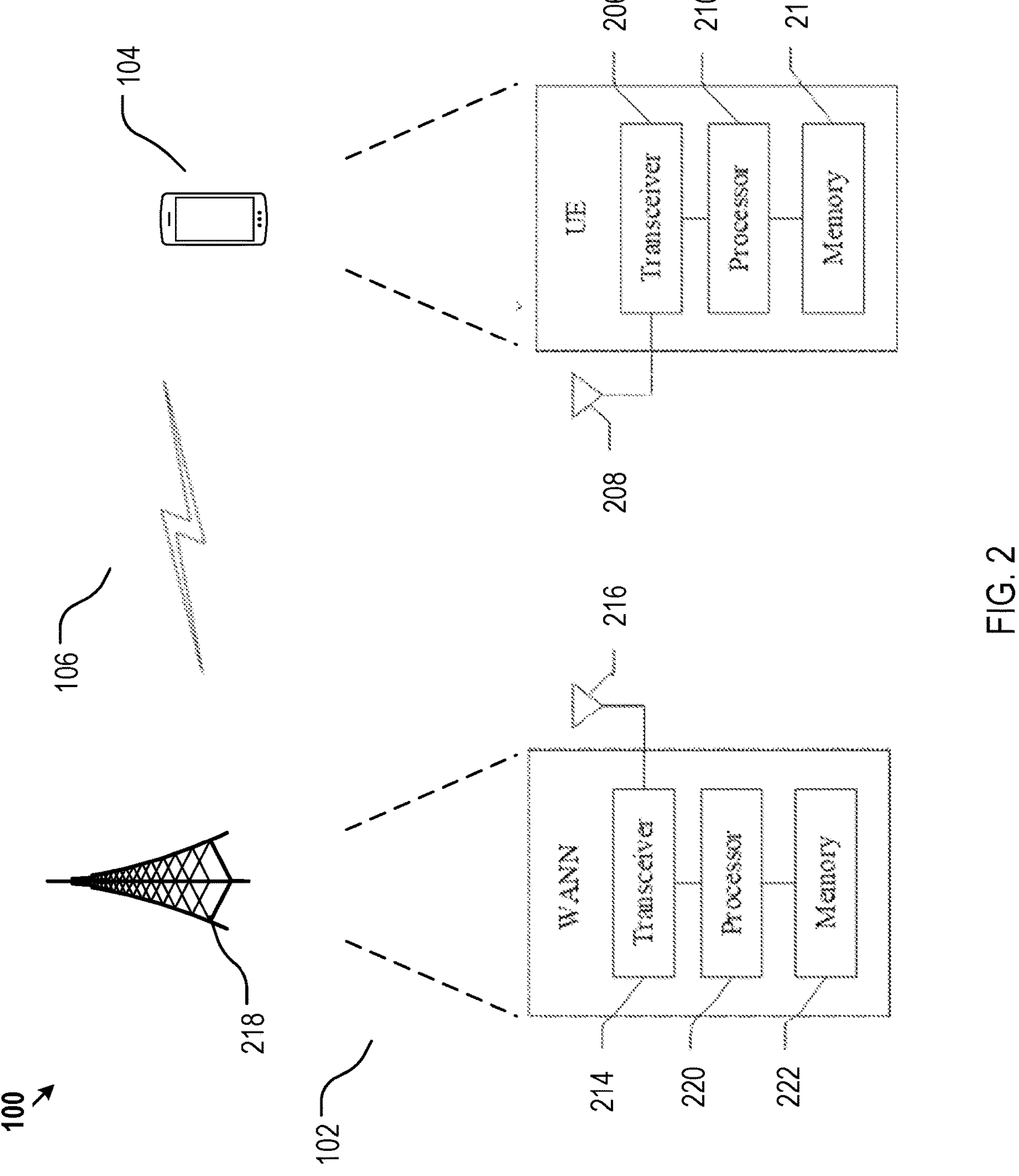
FIG. 2 Shows various example processing components of the wireless terminal device and the wireless access network node of FIG. 1.

FIG. 2 further shows example processing components of the WANN 102 and the UE 104 of FIG. 1. The UE 104, for example, may include transceiver circuitry 206 coupled to one or more antennas 208 to effectuate wireless communication with the WANN 102. The transceiver circuitry 206 may also be coupled to a processor 210, which may also be coupled to a memory 212 or other storage devices. The memory 212 may be transitory or non-transitory and may store therein computer instructions or code which, when read and executed by the processor 210, cause the processor 210 to implement various ones of the methods described herein. Likewise, the WANN 102 may include transceiver circuitry 214 coupled to one or more antennas 216, which may include an antenna tower 218 in various forms, to effectuate wireless communications with the UE 104. The transceiver circuitry 214 may be coupled to one or more processors 220, which may further be coupled to a memory 222 or other storage devices. The memory 222 may be transitory or non-transitory and may store therein instructions or code that, when read and executed by the one or more processors 220, cause the one or more processors 220 to implement various functions of the WANN 102 described herein.

Wireless Communication Resource Scheduling/Signaling

Returning to FIG. 1, the radio communication resources for the over-the-air interface 106 may include a combination of frequency, time, and/or spatial communication resources organized into various resource units or elements in frequency, time, and/or space. The radio communication resources 106 in frequency domain may include portions of licensed radio frequency bands, portions of unlicensed ration frequency bands, or portions of a mix of both licensed and unlicensed radio frequency bands. The radio communication resources 106 available for carrying the wireless communication signals between the base station 102 and user equipment 104 may be further divided into physical downlink channels 110 for transmitting wireless signals from the base station 102 to the user equipment 104 and physical uplink channels 120 for transmitting wireless signals from the user equipment 104 to the base station 102. The physical downlink channels 110 may further include physical downlink control channels (PDCCHs) 112 and physical downlink shared channels (PDSCHs) 114. Likewise, the physical uplink channels 120 may further include physical uplink control channels (PUCCHs) 122 and physical uplink shared channels (PUSCHs) 124. For simplification, other types of downlink and uplink channels are not shown in FIG. 1 but are within the scope of the current disclosure. The control channels PDCCHs 112 and PUCCHs 122 may be used for carrying control information in the form of control messages 116 and 126, herein referred to as Downlink Control Information (DCI) messages or Uplink Control Information (UCI) messages. The shared channels (shared between data and control information) PDSCHs 114 and PUSCHs 124 may be allocated and used for communicating downlink data transmissions 118 and uplink data transmissions 128 between the base station 102 and the user equipment 104.

The allocation and configuration of the radio communication resources associated with the data channels, such as the PDSCHs and the PUSCHs may be provided by one or more resource scheduling DCIs carried in the PDCCHs. The PDCCHs may be shared by a plurality of UEs in the access network. A particular UE may be configured to perform blind decode procedures on a preconfigured UE-specific Search Space (USS) to detect and identify a payload of a resource scheduling DCI carried in the PDCCH that specifically targets the particular UE. The blind decoding may be performed on preconfigured monitoring occasions of the PDCCH associated with USS. Such monitoring occasions may be referred to as a set of PDCCH candidates. Each PDCCH candidate may be associated with a set of consecutive Control Channel Elements (CCEs). The UE may specifically use its Radio Network Temporary Identifier (RNTI) to decode the PDCCH candidates. The RNTI may be used to demask a PDCCH candidate's CRC. If no CRC error is detected, the UE determines that PDCCH candidate carries its own control information. The UE may then process the DCI and extract the resource allocation information pertaining to the PDSCH and/or PUSCH for receiving and/or transmitting data.

Resource Scheduling in Multi-Cell Environment and Carrier Aggregation

Figure 3:
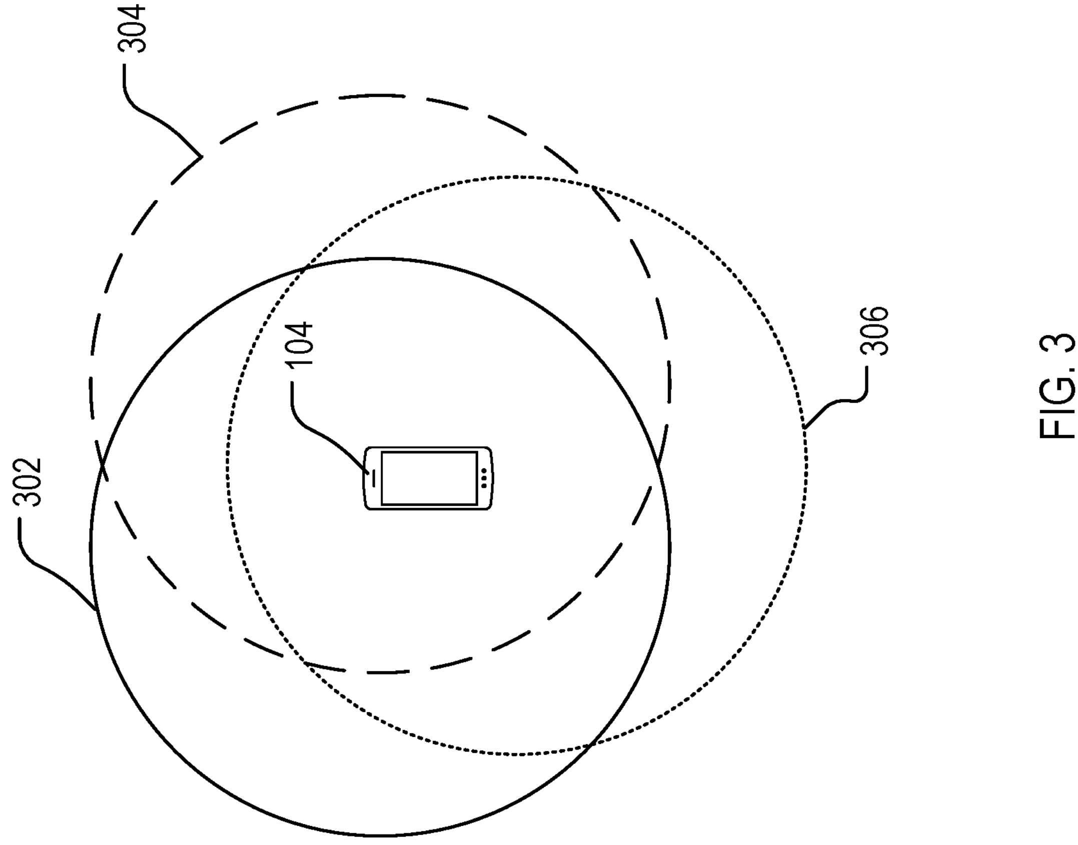
FIG. 3 shows an example multi-cell wireless communication environment.

In the access network illustrated in FIG. 1, The WANN 102 alone or with other WANNs may be configured to support multiple spatially overlapping serving cells as illustrated in FIG. 3 as cell 1 (302), cell 2 (304), and cell 3 (306). Each of these serving cells may be associated with one or more distinct radio carriers (or "carrier", for simplicity) with preconfigured bandwidth. A carrier may be configured for DownLink (DL) communication, Uplink (UL) communication, or Supplemental UpLink (SUL) communication. In a normal situation, a serving cell may be configured with one DL carrier and one UL carrier. However, in some other circumstances, a serving cell may alternatively be configured with various combination of carriers and carrier types. For example, a serving cell may alternatively be configured with one or more UL carriers only, or one or more DL carriers only, or with one or more UL carriers and one or more SUL carriers, or with one or more DL carriers and one or more UL carriers. If needed, the bandwidth of a carrier may be further divided into preconfigured bandwidth parts (BWPs) each corresponding Sub-Carrier Spacings (SCSs). The SCSs, for example, can each be configured by selection from a set of allowed SCSs. For example, the allowable SCS may be 15 kHz, 30 kHz, 60 kHz, and 120 kHz, respectively represented by an SCS parameter u of value 0, 1, 2, or 3. Each cell shown in FIG. 3 may be configured with its various communication channels including PDCCH, PDSCH, PUCCH, PUSCH, and other channels.

The UE 104 may be present at a location covered by multiple serving cells, as shown in FIG. 3. The UE thus may be connectable to the WANN(s) via the multiple cells. In some implementations, the UE may be configured to transmit/receive information using more than one cell in parallel and at the same time in a Carrier Aggregation (CA) mode.

In a multi-cell and CA environment, resource scheduling for the UE, such as the scheduling of the PDSCHs/PUSCHs resources via DCI in the PDCCHs may need to be performed for each of a plurality of serving cells that the UE is connected to for service. In some normal implementations, the scheduling of the PDSCHs/PUSCHs may be intra-cell. In other words, the scheduling of the PDSCHs/PUSCHs associated with a particular serving cell may be carried by DCIs in PDCCHs of the same cell. In such implementations, to schedule PDSCHs/PUSCHs in multiple cells for the UE, corresponding multiple DCI messages would need be transmitted and detected in the multiple cells via the blind decoding procedure described above.

In some alternative implementations, as described in detail below, the scheduling of the PDSCHs and/or PUSCHs of multiple cells may be carried in a single DCI scheduling message in a PDCCH of one of the serving cells, thereby providing reduced scheduling overhead in the multi-cell and CA environment. In some further implementations, such a single DCI scheduling message may be arranged for transmission in PDCCHs associated with any one of the serving cells, thereby providing the WANNs higher flexibility in PDSCH/PUSCH scheduling for UEs. While the examples below are provided in the context of scheduling PDSCH resources. The various principles underlying these implementations are applicable to the scheduling of other communication resources such as PUSCH resources.

Single DCI for Multiple Scheduled Cells by One Scheduling Cell

Figure 4:
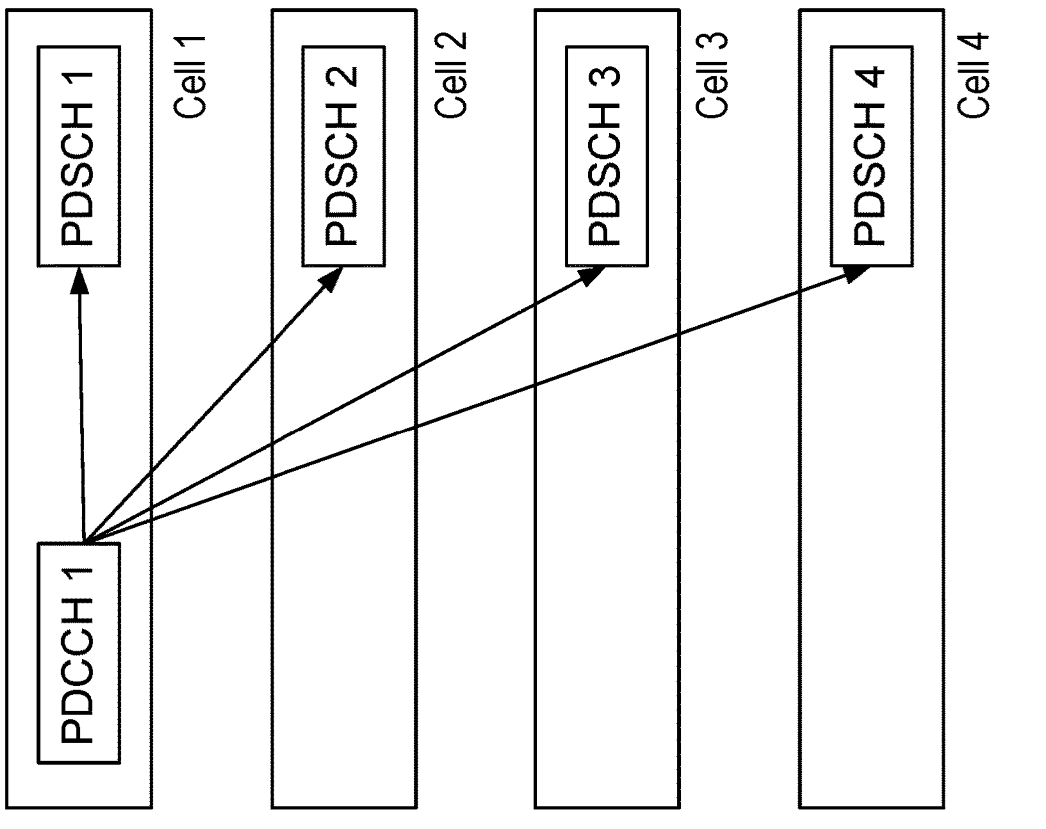
FIG. 4 illustrates an example mechanism for scheduling wireless communication resources associated with a plurality of cells for a wireless terminal device using a single downlink scheduling message by a pre-configured single scheduling cell in the example multi-cell environment of FIG. 3.

The basic scheme for using a single DCI scheduling message to schedule PDSCH resources in multiple serving cells is illustrated in FIG. 4. Any number P of serving cells may be scheduled by a single DCI scheduling message, P being a positive integer. Merely as an example, FIG. 4 shows four serving cells, labeled as Cell 1, Cell, 2, Cell 3 and Cell 4. Each of these cells may be associated with its PDSCHs to be scheduled by the WANN or base station. For simplicity, the PDSCHs for each cell may be collectively represented by singular "PDSCH". They are labeled as PDSCH 1, PDSCH 2, PDSCH 3, and PDSCH 4 for Cell 1, Cell 2, Cell 3, and Cell 4, respectively.

To illustrate the basic principle of single DCI scheduling, it is assumed that, in FIG. one of the cells (e.g., Cell 1) is designated/configured and used to carry the single DCI for multi-cell scheduling. The DCI may thus be carried, for example, in the PDCCH in Cell 1, as labeled as PDCCH 1 in FIG. 4. The arrows in the FIG. 4 indicate that the PDSCHs of Cell 1-4 are all scheduled by the single DCI message in PDCCH 1. In this example, Cell 1-4 are all scheduled cells, whereas cell 1 is also a scheduling cell. While Cell 1 is used as an example of the single scheduling cell and the corresponding PDCCH 1 is used as an example channel to carry the single multi-cell scheduling DCI, any other cell may be alternatively used as the single scheduling cell and the corresponding PDCCH may be used to carry the single multi-cell scheduling DCI.

With such an implementation, the base station may transmit the single multi-cell scheduling DCI for a target UE in one of search spaces including the PDCCH on the scheduling cell 1. The target UE may be configured to monitor the PDCCH in the search space configured in Cells 1-4, perform Blind Decoding (BD) of the PDCCH candidates (containing a number of consecutive CCEs) associated with the search spaces on the scheduling cell. The single multi-cell scheduling DCI may contain, e.g., the PDSCH scheduling information for the UE for the scheduled Cell 1 through Cell 4.

The blind decoding by the UE may be associated with a BD per cell budget parameter $$M_{PDCCH}^{max,slot,\mu},$$

representing a maximum number of monitored PDCCH candidates per slot/span for a Downlink Bandwidth Part (DL BWP) with a Sub-Carrier Spacing (SCS) configuration $\mu \in \{0, 1, 2, 3\}$ for a single serving cell. Table 1 shows an example specification of $$M_{PDCCH}^{max,slot,\mu}$$

for $\mu \in \{0, 1, 2, 3\}$, corresponding to SCSs of 15 kHz, 30 kHz, 60 kHz, and 120 kHz. In some other implementations, another per cell budget parameter, $$C_{PDCCH}^{max,slot,\mu},$$

may be specified, representing a maximum number of non-overlapped CCEs per slot/span for a DL BWP with a SCS configuration $\mu \in \{0, 1, 2, 3\}$ for a single serving cell. Table 1 further shows an example specification of $$C_{PDCCH}^{max,slot,\mu}$$

for $\mu \in \{0, 1, 2, 3\}$ corresponding to SCSs of 15 kHz, 30 kHz, 60 kHz, and 120 kHz. In this disclosure, $$M_{PDCCH}^{max,slot,\mu}$$

and $$C_{PDCCH}^{max,slot,\mu}$$

is referred to as the first BD/CCE budgets.

TABLE 1

| μ | SCS (kHz) | $M_{PDCCH}^{max,slot,\mu}$ | $C_{PDCCH}^{max,slot,\mu}$ |
|---|---|---|---|
| 0 | 15 | 44 | 56 |
| 1 | 30 | 36 | 56 |
| 2 | 60 | 22 | 48 |
| 3 | 120 | 20 | 32 |

As an example of BD counting, when the UE performs a BD procedure in an effort to retrieve PDSCH resource scheduling information for Cell 1 associated with an SCS of 15 kHz (corresponding to u=0), a BD counter and an CCE counter associated with Cell 1 and the SCS are incremented. Such counters thus measure progress of the UE monitoring of PDCCH against the first BD/CCE budgets of $$M_{PDCCH-CELL1}^{max,slot,0} = 44$$

and $$C_{PDCCH-CELL1}^{max,slot,0} = 56$$

according to Table 1. In the normal single-cell scheduling scheme, each blind decoding on the PDCCH on its single scheduling cell would be clearly counted towards a particular scheduled cell and a particular SCS against the corresponding first BD/CCE budgets without any ambiguity. However, in the implementation of FIG. 4 with single DCI for multi-cell scheduling, each BD may be considered as being performed for all of the serving cells. The question then becomes which of the serving cells should the performed BDs/CCEs be counted towards against the first BD/CCE budgets.

The following optional implementations may be used with respect to the BD/CCE counting for multi-cell scheduling with a single multi-cell scheduling DCI. Possible options are listed below.

Counting Scheme 1:

Counted in each scheduled cell. That is: the BDs/CCEs of monitoring the PDCCH carrying the single multi-cell scheduling DCI are counted in each USS corresponding to each scheduled cell on the scheduling cell. The BDs/CCEs for detecting a single multi-cell scheduling DCI may be counted in each of the scheduled cells. In the example of FIG. 4, an BD counter and CCE counter associated with every one of the scheduled cells on the scheduling cell is kept by the UE. As described above, the first BD/CCE budgets for a SCS of each scheduled cell is specified in Table 1. For example, if the UE is allocated with all four cells as illustrated in FIG. 4, and the SCS is 15 kHz for all cells, then each cell would maintain a BD counter and a CCE counter. Each BD counter would be compared against the first BD budget of 44 and each CCE counter would be compared against the first CCE budget of 56 in case no CA scaling (described below) is needed.

Counting Scheme 2:

Only counted in one scheduled cell. That is: the BDs/CCEs of the PDCCH carried the single multi-cell scheduling DCI are counted in a USS corresponding to a scheduled cell on the scheduling cell. The BDs/CCEs for detecting a single multi-cell scheduling DCI on the scheduling cell may be only counted in one of the scheduled cells against the first BD/CCE budget of that scheduled cell. In other words, the BDs/CCEs on the PDCCH carrying the single multi-cell scheduling DCI may be counted in a USS corresponding to one scheduled cell but not the other scheduled cells. For example, in FIG. 4, the BDs/CCEs performed by the UE may be counted towards Cell 1 only but not towards Cells 2-4, or Cell 2 only but not towards Cells 1, 3, and 4, or Cell 3 only but not towards Cells 1, 2, and 4, or Cell 4 only but not towards Cells 1-3.

According to the description above, a second BD/CCE budget for a particular SCS for the UE would be the number of scheduled cells (or more accurately, number of activated DL BWPs with each activated DL BWP on one cell) configured with the particular SCS multiplied by the first BD/CCE budgets for the SCS:

$$N_{cells}^{DL,\mu} M_{PDCCH}^{max,slot,\mu},$$

where $$N_{cells}^{DL,\mu}$$

represents the number of downlink cells configured for the UE with DL BWPs having SCS configuration μ. This would be the actual budget if the maximum number of cells that the UE is capable of supporting $$N_{cells}^{cap}$$

is the same as or larger than $$\sum_{j=1}^{3} N_{cells}^{DL,j}.$$

However, in some implementations, such second budgets may be limited when the CA capability of the UE is below the actual number of serving cells. Specifically, when $$\sum_{j=1}^{3} N_{cells}^{DL,j}$$

exceeds $$N_{cells}^{cap},$$

the UE would then need to distribute its processing capability to processing of a larger number of active cells, thereby necessitate reduced BE/CCE budgets per SSC. Thus, when $$N_{cells}^{cap}$$

is considered, the second BD/CCE budget is defined as:

$$M_{PDCCH}^{total,slot,\mu} = \left\lfloor N_{cells}^{cap} \cdot M_{PDCCH}^{max,slot,\mu} \cdot N_{cells}^{DL,\mu} \Big/ \sum_{j=0}^{3} N_{cells}^{DL,j} \right\rfloor; \quad (1)$$

$$C_{PDCCH}^{total,slot,\mu} = \left\lfloor N_{cells}^{cap} \cdot C_{PDCCH}^{max,slot,\mu} \cdot N_{cells}^{DL,\mu} \Big/ \sum_{j=0}^{3} N_{cells}^{DL,j} \right\rfloor, \quad (2)$$

where, again, $$N_{cells}^{DL,\mu}$$

represents the number of downlink cells configured for the UE with DL BWPs having SCS configuration μ, and $$\sum_{j=1}^{3} N_{cells}^{DL,j}$$

represents the total number cell counts and it may be larger, equal, or smaller than $$N_{cells}^{cap}$$

in different situations. The overall operator in Formulae (1) and (2) on the right side is for floor( ) operation. Activated DL BWPs of activated cells are counted. A DL BWP of a deactivated cell is indicated by an index provided by firstActiveDownlinkBWP-Id for the deactivated cell. The UE is not required to monitor more than $$M_{PDCCH}^{total,slot,\mu}$$

number of PDCCH candidates and $$C_{PDCCH}^{total,slot,\mu}$$

number of non-overlapped CCEs per slot on the active DL BWP(s) of scheduling cell(s) from the $$N_{cells}^{DL,\mu}$$

downlink cells, as indicated in Formula (1) and (2).

The actual BD/CCE budget for a scheduled cell is min $$\{M_{PDCCH}^{max,slot,\mu},\ M_{PDCCH}^{total,slot,\mu}\},$$

min $$\{C_{PDCCH}^{max,slot,\mu},\ C_{PDCCH}^{total,slot,\mu}\}$$

for SCS μ, which is the smaller value of the first BD/CCE budget and the second BD/CCE budget. In other words, when $$N_{cells}^{cap} \geq \sum_{j=1}^{3} N_{cells}^{DL,j},$$

the actual SCS budget is the first budget, whereas when $$N_{cells}^{cap} < \sum_{j=1}^{3} N_{cells}^{DL,j},$$

the actual budget is the second budget.

Single DCI for Multiple Scheduled Cells by Any One of Multiple Scheduling Cells

The basic scheme above for single multi-cell scheduling DCI from a single scheduling cell may be expanded to multiple scheduling cells. In a general implementation, a single multi-cell scheduling DCI may be transmitted by any one of two or more scheduling cells to simultaneous schedule two or more scheduled cells. The arrangement of correspondence between sets of scheduling cells and sets of scheduled cells may be configured from the network side.

Embodiment 1

Figure 5:
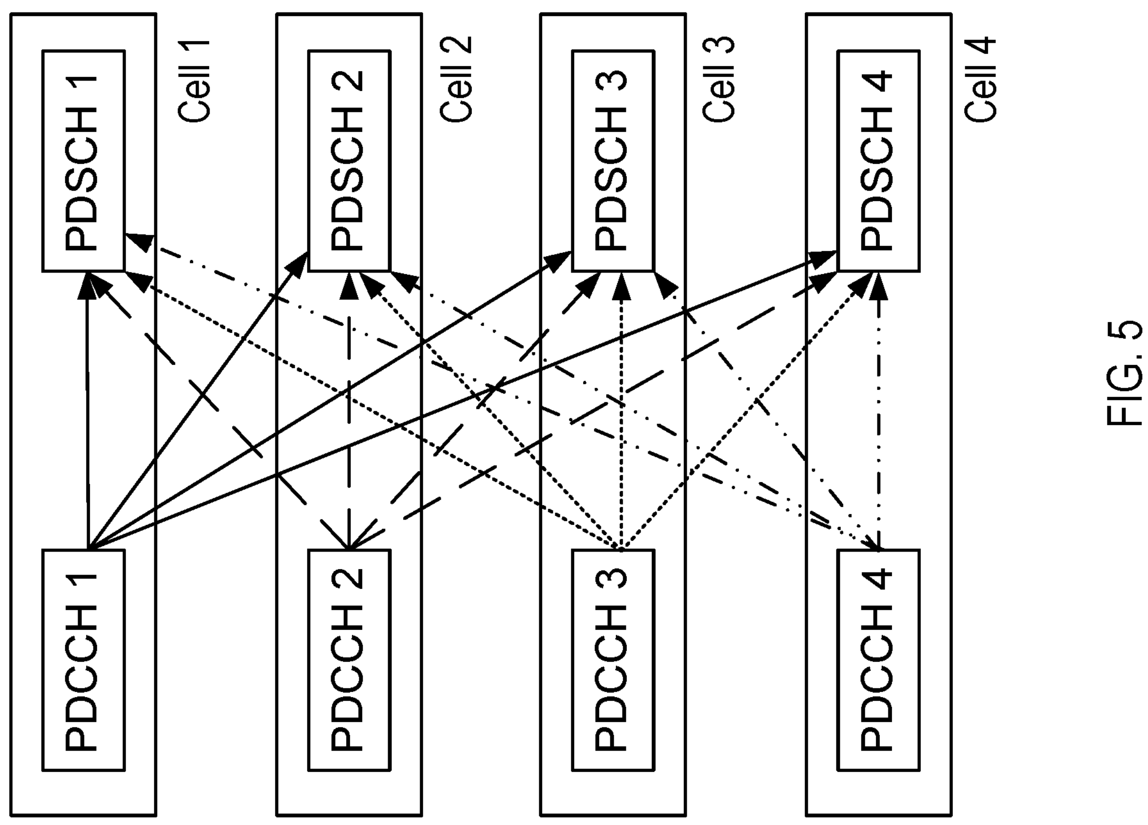
FIG. 5 illustrates an example mechanism for scheduling wireless communication resources associated with a plurality of serving cells for a wireless terminal device using a single downlink scheduling message by any of the plurality of serving cells in the example multi-cell environment of FIG. 3, where each of the plurality of serving cells is a possible scheduling cell for scheduling resources for all of the plurality of serving cells.

A specific example implementation/configuration is shown in FIG. 5, in which the UE is configured with a set of scheduling cells consisting of all serving cells (Cells 1-4) and a set of scheduled cells also consisting of all serving cells (Cells 1-4). The PDSCHs of the set of scheduled cells would be simultaneously scheduled by a single multi-cell scheduling DCI. The single multi-cell scheduling DCI may be transmitted on PDCCH of any one of the set of scheduling cells. No other restrictions may be applied in this embodiment. In comparison to the implementation of FIG. 4, while the single multi-cell scheduling DCI in FIG. 5 would still be actually transmitted in the PDCCH on one scheduling cell to schedule PDSCHs of all the scheduled cells, just like FIG. 4, the PDCCH carrying the single multi-cell scheduling DCI in FIG. 5 can be any one rather than a fixed one of the scheduling cells. As such the UE needs to be configured to blind decode PDCCH on all four scheduling cells, as they are all potential scheduling cells.

Embodiment 2

Figure 6:
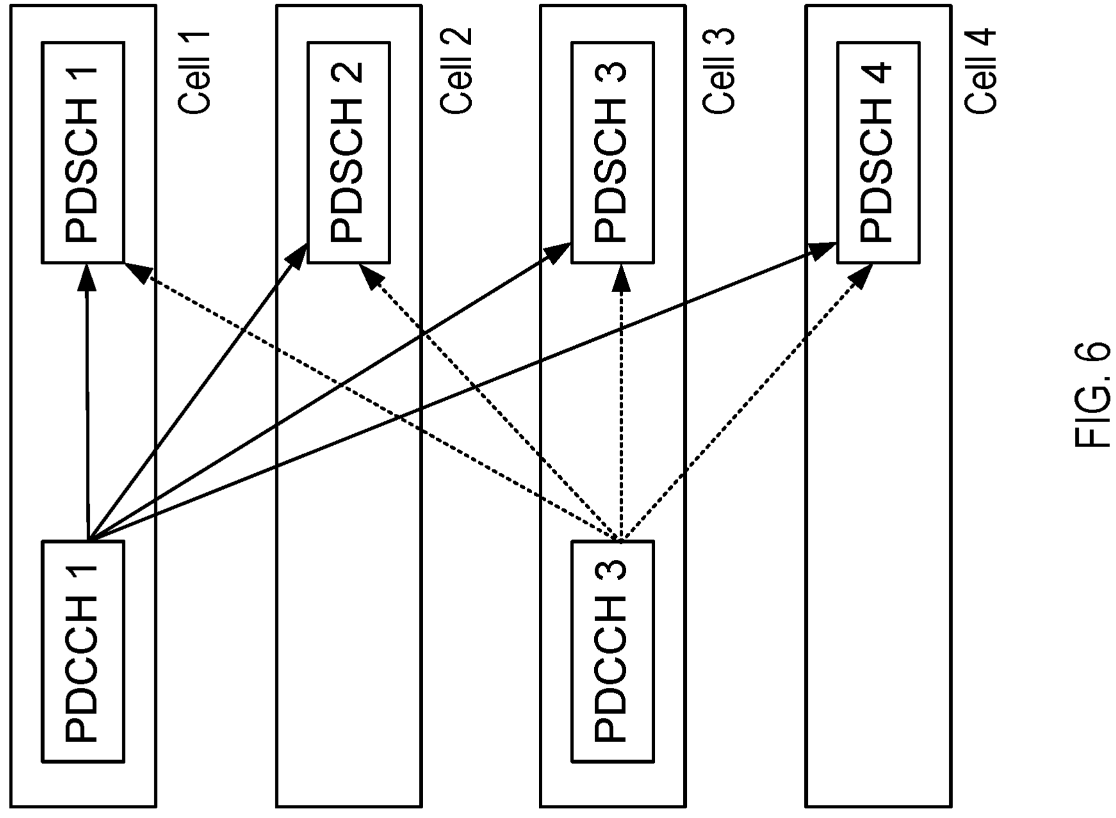
FIG. 6 illustrates an example mechanism for scheduling wireless communication resources associated with a plurality of serving cells for a wireless terminal device using a single downlink scheduling message by any of a subset of the plurality of serving cells in the example multi-cell environment of FIG. 3, where each of the subset of serving cells is a possible scheduling cell for scheduling resources for all of the plurality of serving cells.

In another specific embodiment, a subset rather than the full set of the serving cells may be configured as scheduling cells. As shown in the example of FIG. 6, a subset of cells acting as scheduling cell may include CELL 1 and CELL 3 only. A single multi-cell scheduling DCI therefore may be transmitted via PDCCH of any of Cell 1 and Cell 3 to schedule PDSCH resources of all the cells. With such example scheme, the UE may monitor PDCCH candidates in on PDCCH 1 and PDCCH 3 only in order to detect and obtain the single multi-cell scheduling DCI targeting it.

Embodiment 3

Figure 7:
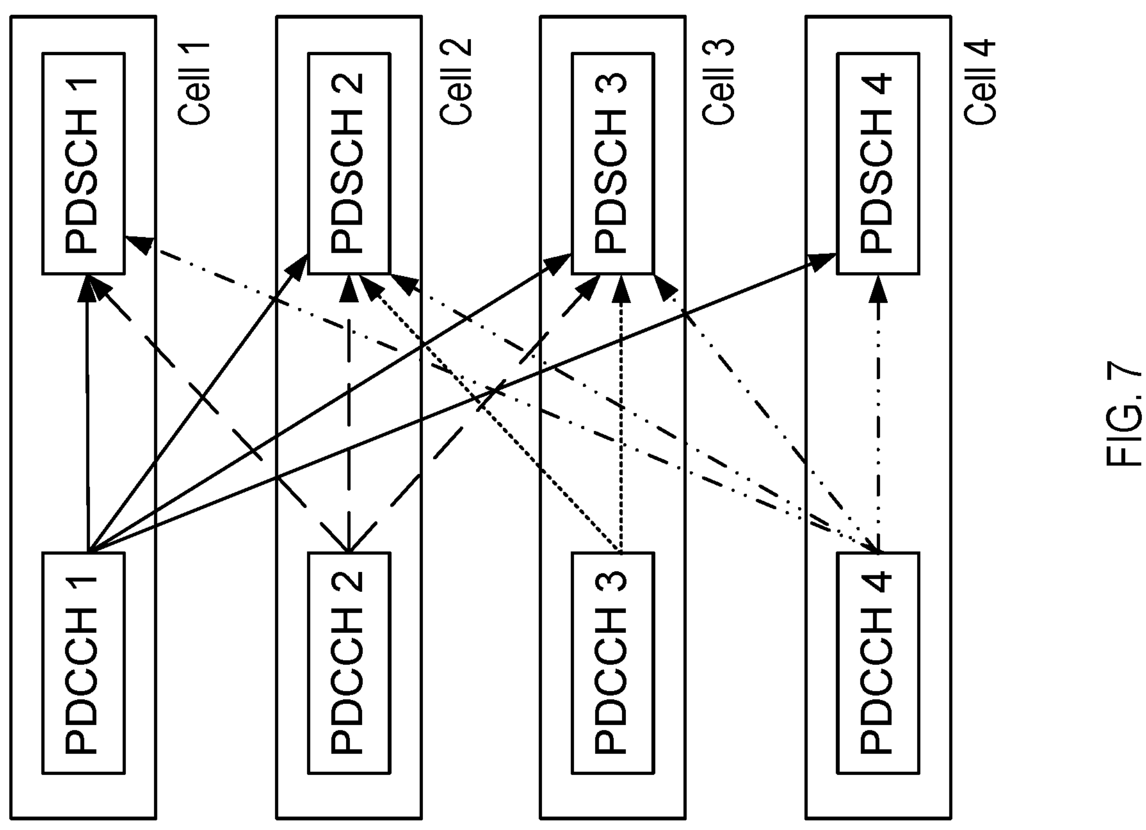
FIG. 7 illustrate an example mechanism for scheduling wireless communication resources associated with a plurality of serving cells for a wireless terminal device using a single downlink scheduling message, where different scheduled cells may be associated with different numbers of possible scheduling cells or a different scheduling cells may be associated with different numbers of scheduled cells.

In another specific embodiment, the set of scheduled cells may be different in number with respect to different scheduling cells or the set of scheduling cells may be different in number with respect to different scheduled cells. As shown in the example of FIG. 7, a single multi-cell scheduling DCI from scheduling Cell 1 or Cell 4 (PDCCH 1 or PDCCH 4) may include PDSCH scheduling information for all four cells, whereas a single multi-cell scheduling DCI from scheduling Cell 2 (PDCCH 2) may include PDSCH scheduling information for CELL 1, CELL 2, and CELL 3, and a single multi-cell scheduling DCI from scheduling Cell 3 (PDCCH 3) may include PDSCH scheduling information for CELL 2 and CELL 3 only. Likewise, scheduled Cell 1 may be scheduled by one of three scheduling cells (1, 2, and 4), scheduled Cells 2 and 3 may be scheduled by one of all four scheduling cells, whereas scheduled Cell 4 may be scheduled by only Cell 1 and Cell 4. When the multi-cell scheduling scheme is configures as such, the UE would perform its BD accordingly. For example, in FIG. 7, the UE would only need to monitor PDCCH candidates on PDCCH 1 and PDCCH 4 if its goal is to obtain PDSCH scheduling information for Cell 4.

Embodiment 4

Figure 8:
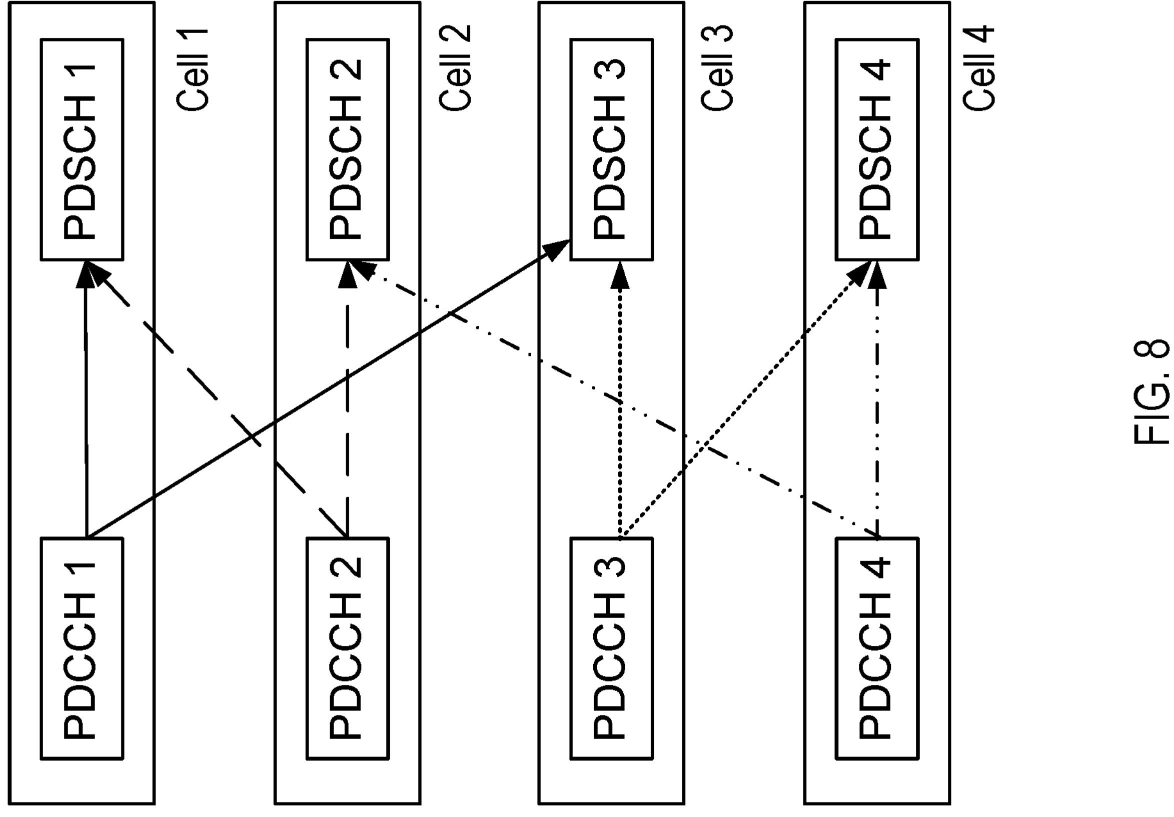
FIG. 8 illustrates an example mechanism for scheduling wireless communication resources associated with a plurality of serving cells for a wireless terminal device using a single downlink scheduling message with an example restriction that forbids cross-cell scheduling.

In another specific embodiment, some additional restrictions may be imposed on the full multi-cell scheduling scheme of FIG. 5. In particular, it may be required that no cross-scheduling be allowed. In other words, a first cell scheduled by the second cell acting as a scheduling cell is not allowed to act as scheduling cell of the second cell. An example is shown in FIG. 8. In FIG. 8, Cell 1 may be scheduled by Cell 2. Cell 2 is thus not allowed to be scheduled by Cell 1 (as indicated by a lack of arrow from PDCCH 1 to PDSCH 2). Likewise, Cell 2 can be scheduled by Cell 4, hence cell 2 cannot schedule Cell 4 (lack of arrow from PDCCH 2 to PDSCH 4). Likewise, Cell 3 can be scheduled by Cell 1, hence cell 3 cannot schedule Cell 1 (lack of arrow from PDCCH 3 to PDSCH 1). Likewise, Cell 4 can be scheduled by Cell 3, hence cell 4 cannot schedule Cell 3 (lack of arrow from PDCCH 4 to PDSCH 3).

Figure 9:
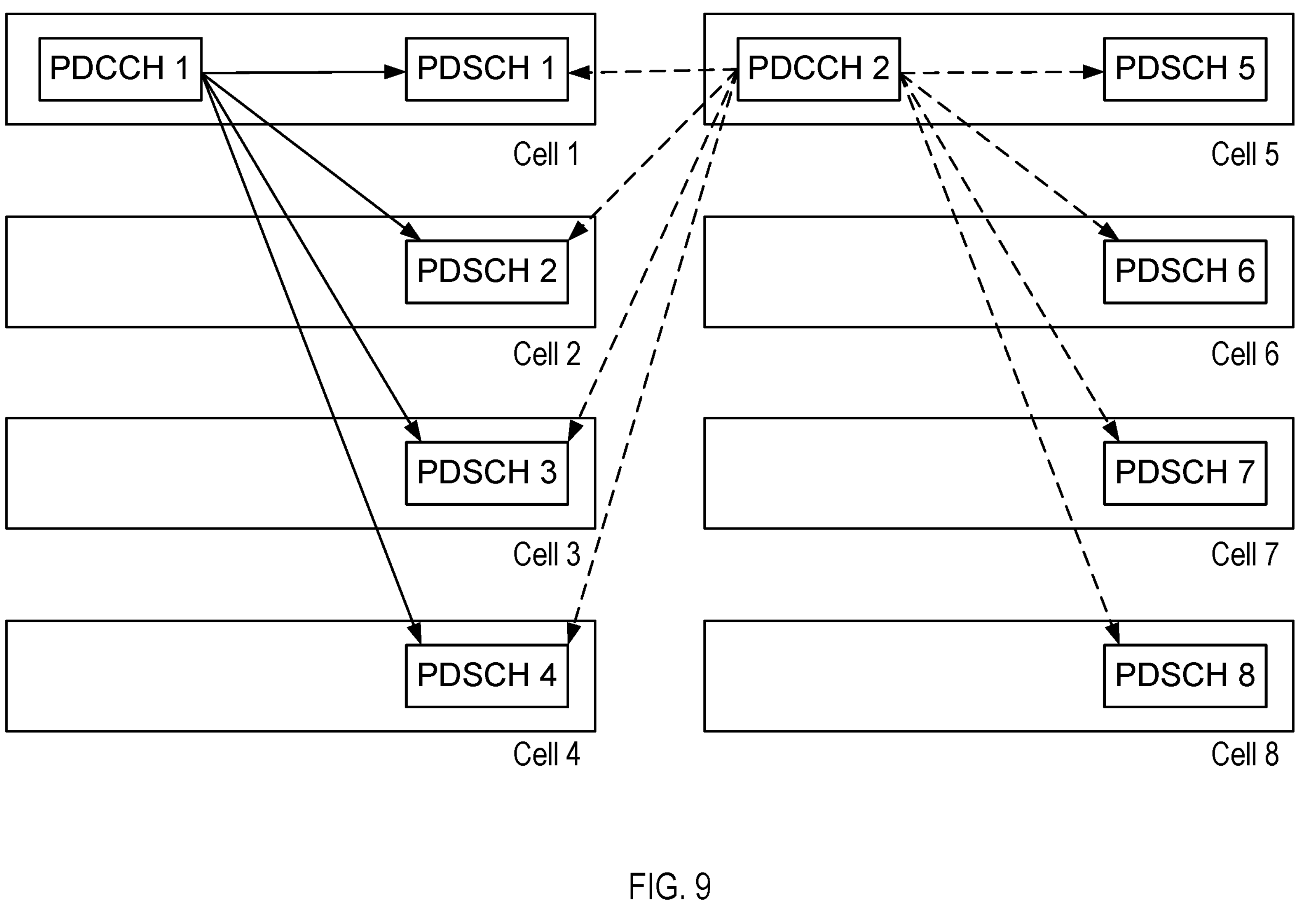
FIG. 9 illustrates another example mechanism for scheduling wireless communication resources associated with a plurality of serving cells for a wireless terminal device using a single downlink scheduling message with an example restriction that forbids cross-cell scheduling.

Another example in which cross-scheduling is forbidden is shown in FIG. 9. In FIG. 9, eight serving cells are configured for the UE. Out of the eight serving cells, Cell 1 and Cell 5 are configured as scheduling cells. Cell 1 is configured to schedule Cell 1-4, whereas cell 5 is configured to schedule Cell 1-8. In such configuration, Cell 5 can schedule Cell 1 whereas Cell 1 does not schedule Cell 5, thereby no-cross scheduling is present. In comparison with the example of FIG. 8, the implementation of FIG. 9 also features different numbers of scheduled cells for each of the two scheduling cells (4 scheduled cells for scheduling Cell 1 and 8 scheduled cells of scheduling cell 5), and vice versa.

Embodiment 5

Figure 10:
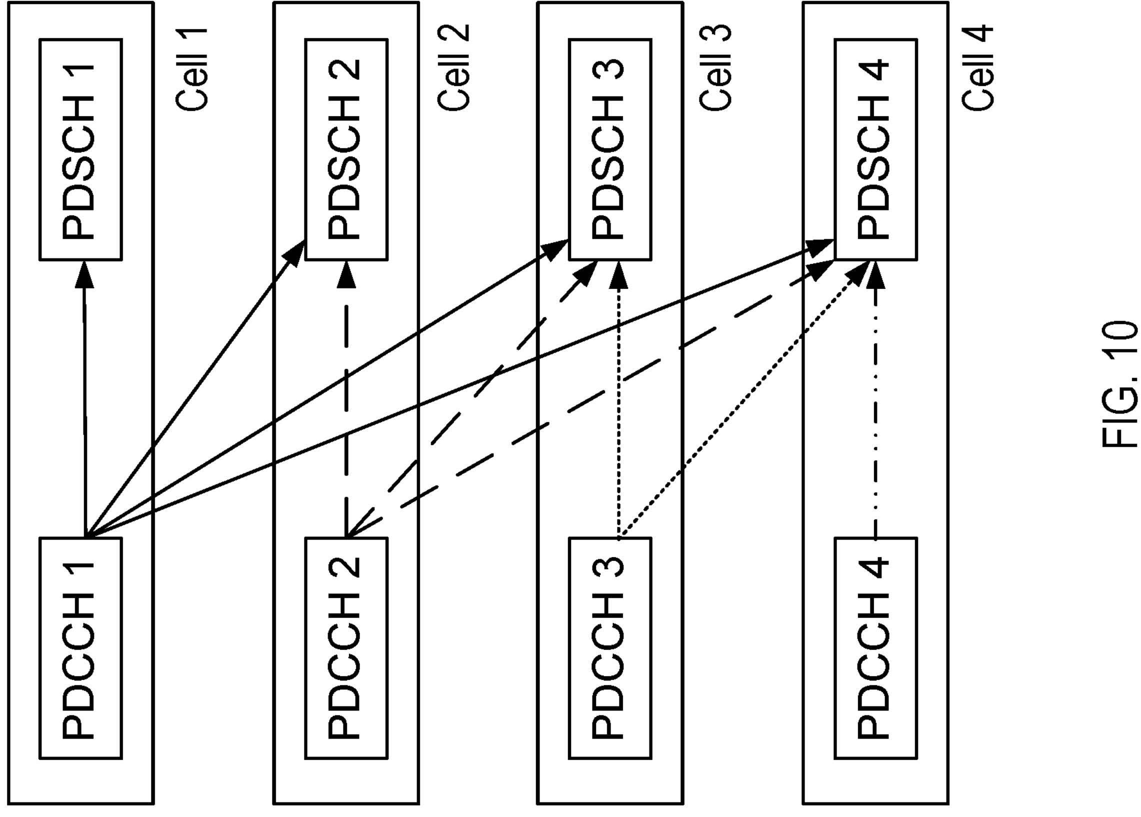
FIG. 10 Illustrates an example mechanism for scheduling wireless communication resources associated with a plurality of serving cells for a wireless terminal using a single downlink scheduling message, where different scheduled cells may be associated with different numbers of possible scheduling cells (as in FIG. 7), where cross-cell scheduling is forbidden (as in FIGS. 8 and 9), and where a scheduling cell is only allowed to schedule a cell having equal or higher cell index.

In another specific embodiment, some additional restrictions may be imposed on the full multi-cell scheduling scheme of FIG. 5. In particular, a scheduling cell may only be allowed to schedule a cell with equal or lower cell index. An example is shown in FIG. 10. In FIG. 10, Cell 1 is allowed to schedule all cells, Cell 2 is allowed schedule Cell 2-4, Cell 3 is allowed to schedule Cell 3-4, whereas Cell 4 is only allowed to schedule Cell 4. This embodiment automatically satisfies the no-cross-scheduling restriction described above, and also has different numbers of scheduling cell corresponding to different scheduled cells, and different numbers of scheduled cells corresponding to different scheduling cells.

Embodiment 6

Figure 11:
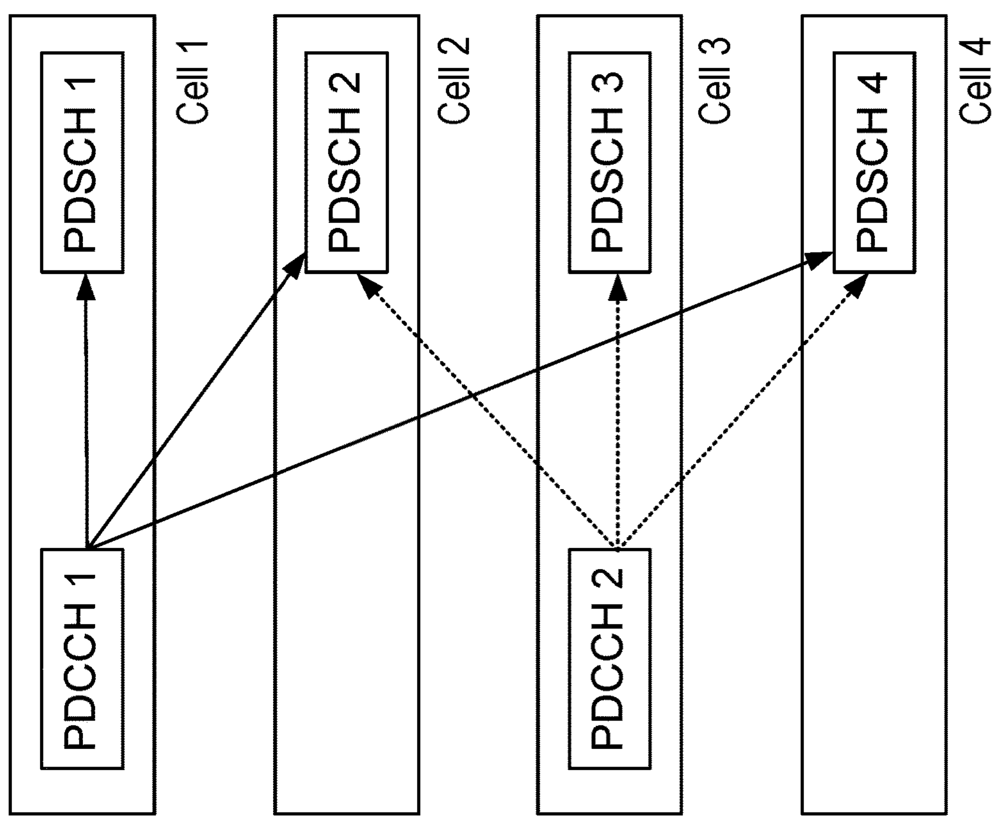
FIG. 11 illustrates an example mechanism for scheduling wireless communication resources associated with a plurality of serving cells for a wireless terminal device using a single downlink scheduling message with an example restriction that forbid a scheduling cell from being scheduled by another serving cell.

In another specific embodiment, some other restrictions may be imposed on the full multi-cell scheduling scheme of FIG. 5. Specifically, a scheduling cell may be forbidden from being scheduled by another serving cell. In other words, a scheduling cell may be required to self-schedule. An example is shown in FIG. 11. In FIG. 11, Cell 1 through Cell 4 are configured for the UE. Among the configured serving cells, Cell 1 and Cell 3 are configured as scheduling cells. Under this particular restriction, Cell 1 and Cell 3 must self-schedule, as shown by the arrows from PDCCH 1 to PDSCH 1 and from PDCCH 2 (in cell 3) to PDSCH 3, and the lack of arrows from the other PDCCH to PDSCH 1 (of Cell 1) and PDSCH 2 (of cell 3).

Figure 12:
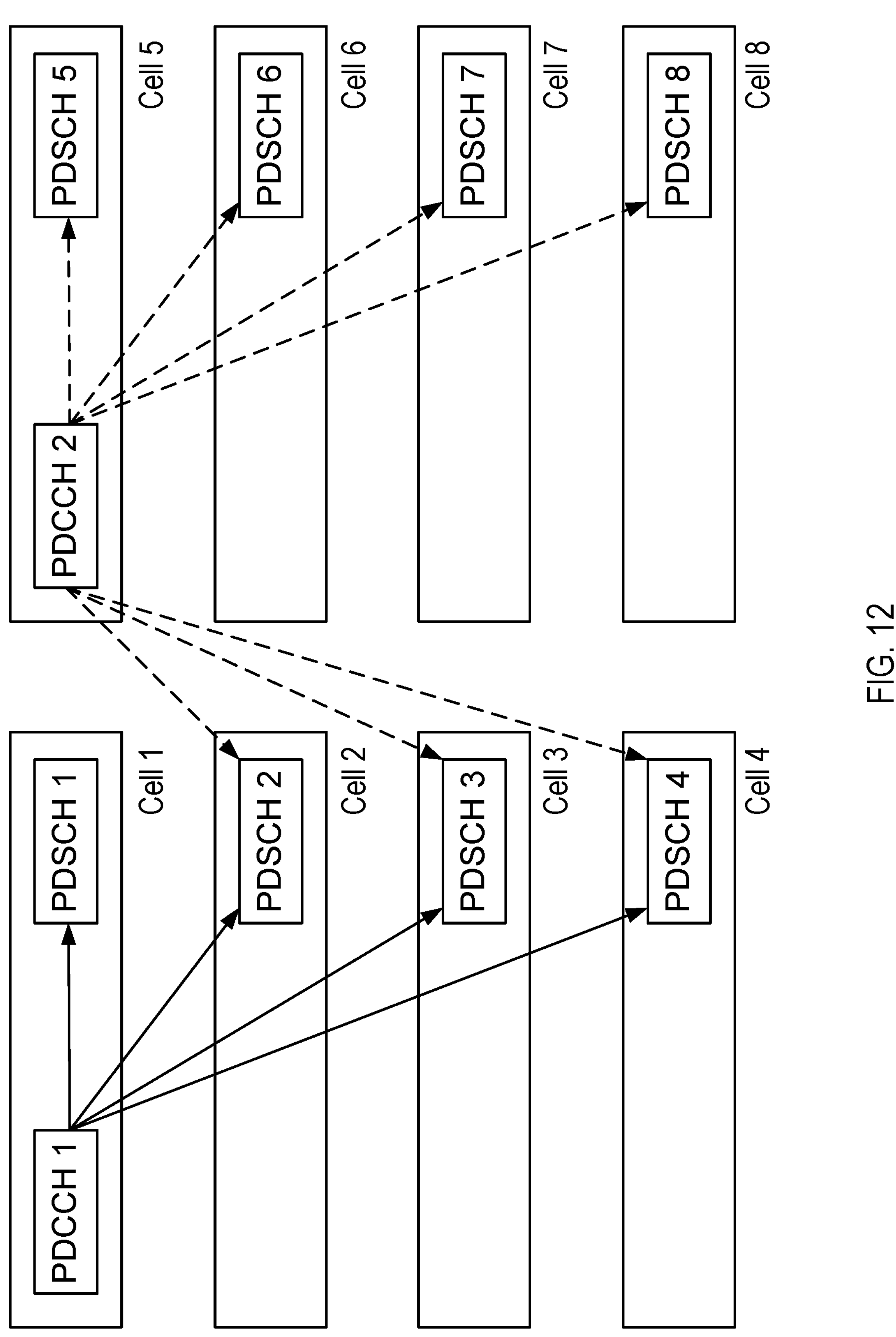
FIG. 12 Illustrates an example mechanism for scheduling wireless communication resources associated with a plurality of serving cells for a wireless terminal device using a single downlink scheduling message following restrictions that both forbid cross-cell scheduling (as in FIGS. 8 and 9) and forbit a scheduling cell from being scheduled by another cell (as in FIG. 11).

Another example is shown in FIG. 12, which is similar to the implementation of FIG. 9 in Embodiment 4 above, except that the scheduling arrow from Cell 5 to Cell 1 is forbidden in FIG. 12. The implementation of FIG. 12 thus does not include any cross-scheduling and also does not allow a scheduling cell to be scheduled by another cell.

BD/CCE Counting in Single Multi-Cell Scheduling DCI with Multiple Scheduling Cells and Multiple Scheduled Cells:

As described above in the basic implementation for single multi-cell scheduling DCI with a single scheduling cell and multiple scheduled cell, because the single multi-cell scheduling DCI is associated with multiple scheduled cells, the BDs/CCEs by the UE may be counted towards various cells per SCS basis in different alternative manners, which are described above as the example Counting Scheme 1 and Counting Scheme 2.

The additional complication of the multi-scheduling-cell implementations over the single-scheduling-cell case is that now each scheduled cell may be scheduled by multiple scheduling cells and the counting schemes above would attribute the firstBD/CCE budget to each of the scheduling cells (in other words, the UE would be given a budget to perform BDs must monitor PDCCHs of multiple scheduling cells). To not significantly increase the monitoring burden of the UE, these two counting schemes may be expanded/modified as illustrated by the examples below.

Modified Counting Scheme 1:

Under the Counting Scheme 1 for the single-scheduling-cell implementation of FIG. 4, The BDs/CCEs for detecting a single multi-cell scheduling DCI may be counted in each of the scheduled cells scheduled by the single multi-cell scheduling DCI on a scheduling cell. If such a scheme would be implemented direct in the multi-scheduling-cell situations of FIG. 5, the BD/CCE budget/capability for a scheduled cell would be increased by N times, because the counting for each scheduled cell would be on N scheduling cells. Here, N represents the number of the scheduling cells for the scheduled cell. In order to achieve less budget/capability increase for a scheduled cell of the UE, the following alternative modification or expansion can be made to the counting scheme 1 in the multi-scheduling-cell situation.

Method 1:

A maximum number of scheduling cells for a scheduled cell may be configured. In other words, a subset of serving cells rather than the full set of serving cells may be configured as scheduling cell for a scheduled cell. For example, in the implementation described above in in FIG. 6, two rather than four serving cells may be configured as scheduling cell for a scheduled cell. In the implementation of FIG. 6, each of the four scheduled cells is scheduled by the two scheduling cells. The BD/CCE budgets for each of the scheduled cells may be reduced (N goes from 4 to 2). Specifically, assuming that Cell 1 has a SCS of 15 kHz, then the total budget or Cell 1 would be at 44×2 rather than 44×4 when all four cells are configured as scheduling cells to schedule all four cells, as in FIG. 5.

Another example of method 1 is shown in FIG. 9. In FIG. 9, Cell 1 and cell 5 rather than all the cells are scheduling cells. As such, the number of scheduling cell is N=2. The BD/CCE budgets are thus reduced compared to implementation with more scheduling cells.

Method 2:

BD/CCE scaling factor may be configured/defined and applied to each scheduling cell for the same scheduled cell. As a result, each scheduling cell for a particular scheduled cell would be given a fraction of the full BD/CCE budget such that the total budgets are maintained towards the level of the single-scheduling-cell implementation.

As an example, in FIG. 5, scaling factors α1, α2, α3, α4 may be defined or configured for each scheduling cell to scaled the base BD/CCE budget for scheduling the same scheduled cell. In some particular implementations, the scaling factors may be configured such that α1+α2+α3+α4=1.

For a specific example, the SCS of cell 1, 2, 3, 4 may all be 15 kHz, and the scaling factors of the four scheduling cells for each of the scheduled cells may be configured/defined as α1=α2=α3=α4=0.25, then maximum BD for a scheduled cell is scaled by the scaling factors to 44*0.25+44*0.25+44*0.25+44*0.25=44. In other words, all scheduling cells of the scheduled cell share to total budget of 44 of the scheduled cell, which is allocated to the scheduling cells according to the scaling factor.

For another example, the SCSs of cell 1, 2, 3, 4 may be 15 kHz, 15 kHz, 30 kHz, 30 kHz and the scaling factors again, may be α1=α2=α3=α4=0.25. Then maximum BD for a first or second scheduled cell is 44*0.25+44*0.25=22 per 1 ms slot (corresponding to the SCS of 15 kHz), and maximum BD for a third or fourth scheduled cell is 36*0.25+36*0.25=18 per 0.5 ms slot (corresponding to the SCS of 30 kHz).

Another example for method 2 is illustrated by the multi-cell scheduling scheme of FIG. 9. BD/CCE scaling factor of each scheduling cell for the same scheduled cell may be configured/defined to maintain a BD/CCE budget similar to that of single-scheduling cell implementation of FIG. 5. For example, as shown in FIG. 9, there are two scheduling cells (Cell 1 and Cell 5). Cell 1-4 are scheduled by both of the scheduling cells, whereas cell 5-8 is scheduled by a single scheduling cells (similar to FIG. 5). Considering cells 1, 2, 3, 4 having multiple (two) scheduling cells, the scaling factors α1, α2 may be defined/configured for each of the two scheduling cells. In some implantations, it may be set that α1+α2=1. Further, it is assumed that the SCS of cells 1 and 5 are both 15 kHz, and assume a configuration of α1=α2=0.5, then maximum BD for each of the scheduled cells 1-4 would be 44*0.5+44*0.5=44. For another example, assuming that the SCSs of cells 1 and 5 are 15 kHz and 30 kHz instead, and that α1=α2=0.5, then maximum BD for each of the scheduled cells 1-4 would be 44*0.5=22 per 1 ms slot, and 36*0.5=18 per 0.5 ms slot.

CA Scaling Under Counting Scheme 1:

Further, for CA scaling under Formulae (1) and (2) for Counting Scheme 1, with respect example in FIG. 5 and if no additional restrictions to the multiple scheduling cell to multiple scheduled cell configuration are considered, and assuming that all of the four cells are configured with the same SCS, the total cell count $$\sum_{\mu=0}^{3} N_{cells}^{DL,\mu}$$

would be 4 cells. However, in the case that all four cells are associated with the four different SCSs, even though there are actually 4 cells for all SCSs, the total cell count $$\sum_{\mu=0}^{3} N_{cells}^{DL,\mu}$$

for determining $$M_{PDCCH}^{total,slot,\mu}$$

in Formulae (1) and (2) for CA scaling would be 16 cells, because for each SCS corresponding to one of the four scheduled cell, 4 scheduling cells would be counted into $$\sum_{\mu=0}^{3} N_{cells}^{DL,\mu}$$

scheduled cells corresponding to one SCS.

In some implementations of Counting Scheme 1, in order to resolve the over counting of the number of cells corresponding to an SCS when different SCSs are configured for some serving cells, a set of CA splitting factors may be introduced for a scheduled cell to be counted into each scheduling cells with a fraction of a cell for cell count purposes.

For example, assuming that there are five serving cells, and all cells schedule all other cells, similar to FIG. 5, CA split factors s1, s2, s3, s4, s5 may be defined for each scheduling cell to schedule a same scheduled cell. In some implementations, the CA split factors may be configured such that s1+s2+s3+s4+s5=1. As an example, it is also assumed that $$N_{cells}^{cap} = 4,$$

and the SCS of cell 1, 2, 3, 4, and 5 are 15 kHz, 15 kHz, 30 kHz, 30 kHz, and 30 kHz, respectively, and the CA split factors for the 5 scheduling cells are configured as s1=s2=s3=s4=s5=0.2. The counting of the scheduling cells would be fractional, yielding:

$$M_{PDCCH}^{total,slot,15\ kHz} = \text{floor}(4*44*[(0.2+0.2)+(0.2+0.2)+(0.2+0.2)+(0.2+0.2)+(0.2+0.2)]/5) = \text{floor}(4*44*2/5) = 70 \text{ per 1 ms slot;}$$

$$M_{PDCCH}^{total,slot,30\ kHz} = \text{floor}(4*36*[(0.2+0.2+0.2)+(0.2+0.2+0.2)+(0.2+0.2+0.2)+(0.2+0.2+0.2)+(0.2+0.2+0.2)]/5) = \text{floor}(4*36*3/5) = 86 \text{ per 0.5 ms slot;}$$

The cell count portions above each contains 5 parts. Each part corresponds to one of the 5 scheduled cells. Each scheduled cell is associated with a set of split factors for the scheduling cells 1-5, which are 15 kHz, 15 kHz, 30 kHz, 30 kHz, and 30 kHz SCS, respectively. The sets of split factors are (0.2, 0.2, 0.2, 0.2, 0.2)) for all cells. The first and second components of these set of split factors are associated with 15 kHz (the scheduling cells 1 and 2). Their sum [(0.2+0.2)+(0.2+0.2)+(0.2+0.2)+(0.2+0.2)+(0.2+0.2)] becomes the cell count portion of the first equation above. The third, fourth, and fifth components of these sets of split factors are associated with 30 kHz (for scheduling cells 3-5). Their sum [(0.2+0.2+0.2)+(0.2+0.2+0.2)+(0.2+0.2+0.2)+(0.2+0.2+0.2)+(0.2+0.2+0.2)] becomes the cell count portion of the second equation above.

As another example for CA scaling under Counting scheme 1 is illustrated with respect to the example configuration of FIG. 9. For the multi-cell scheduling configuration of FIG. 9, if no additional restriction is provided for counting the number of cells in Formulae (1) ad (2), 8 cells would be counted for cells 1 and 5 with the same SCS, and 12 cells would be counted for cells 1 and 5 in case cells 1 and 5 have different SCSs.

As such, CA split factors s1 and s2 with respect to scheduling cells 1 and 5 may be configured for a same scheduled cell. In some implementations, it may be configured/defined that s1+s2=1. It is assumed that $$N_{cells}^{cap} = 4,$$

and that the SCS of cells 1 and 5 are 15 kHz, 30 kHz, and that s1=s2=0.5. The counting of the scheduling cells would be fractional, yielding:

$$M_{PDCCH}^{total,slot,15\ kHz} = \text{floor}(4*44*[0.5+0.5+0.5+0.5+0+0+0+0]/8) = \text{floor}(4*44*2/8) = 44 \text{ per 1 ms slot;}$$

$$M_{PDCCH}^{total,slot,30\ kHz} = \text{floor}(4*36*[0.5+0.5+0.5+0.5+1+1+1+1]/8) = \text{floor}(4*36*6/8) = 108 \text{ per 0.5 ms slot;}$$

The cell count portions above each contains 8 parts. Each part corresponds to one of the 8 scheduled cells. Each scheduled cell is associated with a set of split factors for the scheduling cells 1 and 5, which are 15 kHz and 30 kHz SCS, respectively. The sets of split factors are (0.5, 0.5) for cells 1-4, and (0, 1) for cells 5-8. The first component of these set of split factors are associated with 15 kHz (the scheduling cell 1). Their sum (0.5+0.5+0.5+0.5+0+0+0+0) becomes the cell count portion of the first equation above. The second component of these sets of split factors are associated with 30 kHz (for scheduling cell 5). Their sum (0.5+0.5+0.5+0.5+1+1+1+1) becomes the cell count portion of the second equation above.

Modified Counting Scheme 2:

Under the Counting Scheme 2 for the single-scheduling-cell implementation of FIG. 4, The BDs/CCEs for detecting a single multi-cell scheduling DCI may be only counted in one of the scheduled cells on a scheduling cell. If such a scheme were to be implemented directly in the multi-scheduling-cell situation of FIG. 5, the BD/CCE budget would not increase because the BDs/CCEs are only counted for one of the scheduled cells rather than each of the scheduled cells. However, additional rules may need to be specified so that it can be determined which one of the cells should be counted for. The following rules are described merely as examples.

- Rule 1: BDs/CCEs for the single multi-cell scheduling DCI is counted in a scheduled cell which is also the scheduling cell.
- Rule 2: For each scheduling cell, select one scheduled cell with lowest index and exclude cells with corresponding index smaller than the index of the scheduling cell.
- Rule 3: BDs/CCEs for the single multi-cell scheduling DCI is counted in the scheduled cell with lowest index.
- Rule 4: BDs/CCEs for the single multi-cell scheduling DCI is counted in one configured scheduled cell. Optionally, one scheduled cell is only counted once.

The application of these rules is further provided below.

Rule 1—Selection of Scheduled Cell for BD/CCE Counting

As summarized above, in the implementations under Rule 1, BDs/CCEs for the single multi-cell scheduling DCI is counted in a scheduled cell which is also the scheduling cell.

For example, as shown in the scheme of FIG. 5, the BDs/CCEs of the multi-cell scheduling PDCCH on cell 1 are counted on cell 1 because while PDCCH 1 is configured to schedule Cells 1 through Cell 4, Cell 1 is also the scheduling cell (PDCCH 1) and thus be selected under Rule 1. Note self-scheduling on each scheduling cell is default supported and all the BD/CCE for a cell is restricted by legacy maximum BD/CCE per slot/span per serving cell.

Another application of Rule 1 is illustrated in the multi-cell scheduling implementation of FIG. 9. In FIG. 9, there are 8 serving cells. Cells 1 and 5 are scheduling cells. Cells 1 and 5 both schedule cells 1-4, whereas, cells 5-8 are only scheduled by single cell 2. Under Rule 1, BDs/CCEs for the single multi-cell scheduling DCI are counted in the scheduling cells because scheduled cells 1 and 5 are also scheduling cells. For example, the BDs/CCEs of the multi-cell scheduling PDCCH on cell 1 are counted in cell 1.

Rule 1—CA Scaling:

In a generally applicable CA scaling implementation, for a scheduled cell that is also a scheduling cell and can be scheduled by N scheduling cells, the CA split factors of the N scheduling cells with respect to the scheduled cell may be used/configured for the scheduled cell, with each split factor corresponding to each of the N scheduling cell to count the scheduled cell number. The number of split factors is equal to N. In some example implementations, the sum of all split factors is 1. In some other implementations, one of the split factors is 1.

Likewise, in a generally applicable CA scaling implementation, for a scheduled cell that is only a scheduled cell (not a scheduling cell) and that can be scheduled by N scheduling cells, CA split factors are used/configured for the scheduled cell with each split factor corresponding to each scheduling cell to count the scheduled cell number. The number of split factors is equal to N. In some example implementations, the sum of all split factors is 1. In some example implementations, one of the split factors is 1.

Specifically, for CA scaling of Counting Scheme 2 and under Rule 1, the CA splitting factors s for the scheduling cells may be configured/defined as 1 for the cell selected under Rule 1 as 1, and 0 for other cells.

For example, it is assumed that there are five serving cells, and all cells schedule all other cells, similar to FIG. 5. As an example, also assume that $$N_{cells}^{cap} = 4,$$

and the SCS of cell 1, 2, 3, 4, and 5 are 15 kHz, 15 kHz, 30 kHz, 30 kHz, and 30 kHz, respectively. With respect to scheduling cell 1 which schedule all five cells, cell 1 is selected for counting BDs/CCEs (because cell one is also the scheduling cell). Thus, with respect to the scheduled cell 1, the s factors for the scheduling cells 1-5 would be (s1, s2, s3, s4, s5)=(1, 0, 0, 0, 0). Likewise, with respect to scheduled cells 2 to 5, the s factors for the 5 scheduling cells would be (s1, s2, s3, s4, s5)=(0, 1, 0, 0, 0), (0, 0, 1, 0, 0), (0, 0, 0, 1, 0), (0, 0, 0, 0, 1). In other words, the CA splitting factors s1, s2, s3, s4, s5 may be defined for each scheduling cell to schedule a same scheduled cell. With such splitting in counting the number of cells for each SCS, the following may be derived based on Formulae (1) and (2):

$$M_{PDCCH}^{total,slot,15\ kHz} = \text{floor}(4*44*(1+1+0+0+0)/5) = \text{floor}(4*44*2/5) = 70 \text{ per 1 ms slot;}$$

$$M_{PDCCH}^{total,slot,30\ kHz} = \text{floor}(4*36*(0+0+1+1+1)/5) = \text{floor}(4*36*3/5) = 86 \text{ per 0.5 ms slot;}$$

The cell count portions above each contains 5 parts. Each part corresponds to one of the 5 scheduled cells. Each scheduled cell is associated with a set of split factors for the scheduling cells 1 and 5 given above. The first and second components of these set of split factors are associated with 15 kHz (the scheduling cells 1 and 2). Their sum [(1+0)+(0+1)+(0+0)+(0+0)+(0+0)]=(1+1+0+0+0) becomes the cell count portion of the first equation above. The second component of these sets of split factors are associated with 30 kHz (for scheduling cells 3-5). Their sum [(0+0)+(0+0)+(0+0)+(1+0)+(0+1)]=(0+0+1+1+1) becomes the cell count portion of the second equation above.

Another example of CA scaling in an implementation that applies Rule 1 is shown by FIG. 9. In FIG. 9, there are 8 serving cells. Cells 1 and 5 are scheduling cells. Cells 1 and 5 both schedule cells 1-4, whereas, cells 5-8 are only scheduled by single cell 2. Under Rule 1, BD/CCE for the single multi-cell scheduling DCI is counted in the scheduling cells because scheduled cells 1 and 5 are also scheduling cells. For example, the BD/CCE of the multi-cell scheduling PDCCH on cell 1 are counted in cell 1.

For CA scaling in FIG. 9, split factors s1 and s2 may be configured with respect to the scheduling cells 1 and 5 for each multi-cell scheduled cells (cells 1-4). For example, optionally s1=1 and s2=0 if the scheduled cell is also a scheduling cell, optionally s1+s2=1 if the scheduled cell is only a scheduled cell. Assuming that $$N_{cells}^{cap} = 4,$$

and that the SCS of cells 1 and 5 are 15 kHz and 30 kHz, and a split factor 1 for a selected scheduled cell that is also a scheduling cell (Rule 1) and a split factor of 0 for other non-selected cells in cell counting for Formulae (1) ad (2), and scheduling cell split factors of (0.5, 0.5) for a scheduled cell that is only a scheduled cell. With such splitting in counting the number of cells for each SCS, the following may be derived based on Formulae (1) and (2):

$$M_{PDCCH}^{total,slot,15\ kHz} = \text{floor}(4*44*(1+0.5+0.5+0.5+0+0+0+0)/8) = \text{floor}(4*44*2.5/8) = 55 \text{ per 1 ms slot;}$$

$$M_{PDCCH}^{total,slot,30\ kHz} = \text{floor}(4*36^{*}(0+0.5+0.5+0.5+1+1+1+1)/8) = \text{floor}(4*36*5.5/8) = 99 \text{ per 0.5 ms slot;}$$

The cell count portions above contain 8 parts. Each part corresponds to one of the 8 scheduled cells. Each scheduled cell is associated with a set of split factors for the scheduling cells 1 and 5, which are 15 kHz and 30 kHz SCS, respectively. The sets of split factors for this example are: (1, 0) for Cell 1, (0.5, 0.5) for Cells 2-4, (0, 1) for Cells 5-8. The first component of these set of split factors are associated with 15 kHz (the scheduling cell 1). Their sum (1+0.5+0.5+0.5+0+0+0+0) becomes the cell count portion of the first equation above. The second component of these sets of split factors are associated with 30 kHz (for scheduling cell 5). Their sum (0+0.5+0.5+0.5+1+1+1+1) becomes the cell count portion of the second equation above.

Rule 2—Selection of Scheduled Cell for BD/CCE Counting

As summarized above, in the implementations under Rule 2, for count BDs/CCEs on each scheduling cell, one scheduled cell with lowest index is selected, excluding cell(s) with corresponding index smaller than the index of the scheduling cell.

The application of Rule 2 is explained below with the example configuration illustrated in FIG. 6. In FIG. 6, not all of the total of 4 serving cells are configured as scheduling cells. In particular, serving cell 1 and 3 are configured as scheduling cells whereas cells 2 and 4 are not configured as scheduling cells. The single multi-cell scheduling DCI thus would be transmitted via one of PDCCH 1 and PDCCH 2 (for cell 3) to schedule PDSCHs of all serving cells. A UE configured with all 4 cells would perform blind decoding on PDCCH 1 (Cell 1) and PDCCH 2 (Cell 3). Applying Rule 2 would mean that BDs/CCEs of the multi-cell scheduling PDCCH on cell 1 are counted to scheduled cell 1, and the BDs/CCEs of the multi-cell scheduling PDCCH on cell 3 are counted to scheduled cell 3. In further detail: (1) the blind decodings performed on the scheduling cell 1 (PDCCH 1) would be counted towards scheduled cell 1, which has the lowest cell index 1 that is not lower than the scheduling cell index (which is 1), and (2) the blind decodings performed on the scheduling cell 3 (PDCCH 2) would be counted towards scheduled cell 3, which has the lowest cell index 3 that is not lower than the scheduling cell index (which is 3). Operation of Rule 2 thus yields BD/CCE counting similar to the self-scheduling implementation, where BDs/CCEs on PDCCH of a scheduling cell is counted to a cell with the same index.

Rule 2—CA Scaling

Further, for CA scaling of Counting Scheme 2 and under Rule 2, like Rule 1, the CA splitting factors s for the scheduling cells may be configured. Optionally the sum of the s factors for the scheduling cells of a particular scheduled cell may be set to 1. In a specific implementation, the s factors for the scheduling cells may be determined by setting the s factor for the cell selected under Rule 2 as 1, s factors for other cells as 0.

In a generally applicable CA scaling implementation, for a scheduled cell that is also a scheduling cell and can be scheduled by N scheduling cells, the CA split factors of the N scheduling cells with respect to the scheduled cell may be used/configured for the scheduled cell, with each split factor corresponding to each of the N scheduling cell to count the scheduled cell number. The number of split factors is equal to N. In some example implementations, the sum of all split factors is 1. In some other implementations, one of the split factors is 1.

Likewise, in a generally applicable CA scaling implementation, for a scheduled cell that is only a scheduled cell (not a scheduling cell) and that can be scheduled by N scheduling cells, CA split factors are used/configured for the scheduled cell with each split factor corresponding to each scheduling cell to count the scheduled cell number. The number of split factors is equal to N. In some example implementations, the sum of all split factors is 1. In some example implementations, one of the split factors is 1.

Assume that there are five serving cells, and cell 1, 3, and 4 schedule all other 5 cells (and cells and 5 being non-scheduling cells), similar to FIG. 6. As an example, further assume that $$N_{cells}^{cap} = 4,$$

and the SCSs of cell 1, 2, 3, 4, and 5 are 15 kHz, 15 kHz, 30 kHz, 30 kHz, and 30 kHz, respectively. CA split factors s1, s2, and s3 may be configured for scheduling cells 1, 3, and 4 with respect to each scheduled cell. The scheduled cells 1, 3, and 4 are also scheduling cells, their split factors for their scheduling cells, for example, may be configure as 1 for the selected scheduled cell under Rule 2 and 0 for other two cells. As such, the s factors for the scheduled cells 1, 3, and 4 may be (s1, s2, s3)=(1, 0, 0), (0, 1, 0), and (0, 0, 1) respectively. The scheduled cells 2 and 5 are not also scheduling cells, their split factors may be configured, for example, both as (s1, s2, s3)=(0.5, 0.25, 0.25). With such splitting in counting the number of cells for each SCS, the following may be derived based on Formulae (1) and (2):

$$M_{PDCCH}^{total,slot,15\ kHz} = \text{floor}(4*44*(1+0.5+0+0+0.5)/5) = \text{floor}(4*44*2/5) = 70 \text{ per 1 ms slot;}$$

$$M_{PDCCH}^{total,slot,30\ kHz} = \text{floor}(4*36*[0+(0.25+0.25)+1+1+(0.25+0.25)]/5) = \text{floor}(4*36*3/5) = 86 \text{ per 0.5 ms slot;}$$

The cell count portions above each contains 5 parts. Each part corresponds to one of the 5 scheduled cells. Each scheduled cell is associated with a set of split factors for the scheduling cells 1, 3, and 4, which are 15 kHz, 30 kHz, and 30 kHz SCS, respectively. The sets of split factors for this example are: (1, 0, 0) for Cell 1, (0.5, 0.25, 0.25) for Cell 2, (0, 1, 0) for Cell 3, (0, 0, 1) for Cell 4, and (0.5, 0.25, 0.25) for Cell 5. The first components of these set of split factors are associated with 15 kHz (the scheduling cell 1). Their sum (1+0.5+0+0+0.5) becomes the cell count portion of the first equation above. The second and third components of these sets of split factors are associated with 30 kHz (for scheduling cells 3 and 4). Their sum [0+(0.25+0.25)+1+1+(0.25+0.05)] becomes the cell count portion of the second equation above.

Rule 3—Selection of Scheduled Cell for BD/CCE Counting

As summarized above, in the implementations under Rule 3, BDs/CCEs for the single multi-cell scheduling DCI is counted for in the scheduled cell with lowest index for a particular scheduling cell.

Operation of Rule 3 can be illustrated by considering the example implementation of FIG. 10. In FIG. 10, Cell 1 is allowed to schedule all cells, Cell 2 is allowed schedule Cell 2-4, Cell 3 is allowed to schedule Cell 3-4, whereas Cell 4 is only allowed to schedule Cell 4. Under Rule 3, for a particular scheduling cell in FIG. 10, the scheduled cell with lowest index is selected for counting the BDs/CCDs performed on the scheduling cell, and the BDs/CCEs on the particular scheduling cell are not counted towards other non-selected scheduled cells of the particular scheduling cell. Specifically, scheduling cell 1 corresponds to scheduled cells 1-4. Cell 1 has the lowest index among cells 1-4 and is thus selected for Scheduling cell 1 under Rule 3. Likewise, scheduling cell 2 schedules scheduled cells 2-4. Cell 2 has the lowest index among cells 2-4 and is thus selected for scheduling cell 2. Likewise, scheduling cell 3 schedules scheduled cells 3-4. Cell 3 has the lowest index among cells 3-4 and is thus selected for scheduling cell 3. Further in FIG. 10, Cell 4 as scheduled cell is selected for scheduling cell 4 as it is the only scheduled cell. As such, under Rule 3 for FIG. 10, the BDs/CCEs of the multi-cell scheduling PDCCH on cell 1 are counted in cell 1, the BDs/CCEs of the multi-cell scheduling PDCCH on cell 2 are counted in cell 2, the BDs/CCEs of the multi-cell scheduling PDCCH on cell 3 are counted in cell 3, the BDs/CCEs of the multi-cell scheduling PDCCH on cell 4 are counted in cell 4.

Rule 3—CA Scaling:

For multi-cell scheduling BD/CCE counting Rule 3 above, the general scheduling cell splitting described above applies to the counting of cells for Formulae (1) and (2). As such, in the generally applicable CA scaling implementation, for a scheduled cell that is also a scheduling cell and can be scheduled by N scheduling cells, the CA split factors of the N scheduling cells with respect to the scheduled cell may be used/configured for the scheduled cell, with each split factor corresponding to each of the N scheduling cell to count the scheduled cell number. The number of split factors is equal to N. In some example implementations, the sum of all split factors is 1. In some other implementations, one of the split factors is 1.

Likewise, in a generally applicable CA scaling implementation, for a scheduled cell that is only a scheduled cell (not a scheduling cell) and that can be scheduled by N scheduling cells, CA split factors are used/configured for the scheduled cell with each split factor corresponding to each scheduling cell to count the scheduled cell number. The number of split factors is equal to N. In some example implementations, the sum of all split factors is 1. In some example implementations, one of the split factors is 1.

In the example of FIG. 10 (where Cell 1 is allowed to schedule all cells, Cell 2 is allowed schedule Cell 2-4, Cell 3 is allowed to schedule Cell 3-4, and Cell 4 is only allowed to schedule Cell 4), if no scheduling cell splitting is applied, 4 cells would be counted for Formulae (1) and (2) when all four cells have the same SCS. When the four cells have different SCSs, then 10 cells would be counted for Formulae (1) and (2) for scheduling cells 1-4. As such, scheduling splitting may be implemented to reduce the cell count, particularly for multi-SCS situations.

As a detailed example, a configuration similar to FIG. 10 and more consistent with the configuration in previous scheduling cell splitting examples is used. In this example 5 serving cells, cells 1-5, rathe rather than 4 serving cells are configured. Cell 1 can configure cells 1-5, cell 2 can configure cells 2-5, cell 3 can configure cells 3-5, cell 4 can configure cells 4-5, and cell 5 can only configure cell 5.

In such scheduling scheme and under Rule 3, the BDs/CCEs of the multi-cell scheduling PDCCH on cell 1 are counted in cell 1, the BDs/CCEs of the multi-cell scheduling PDCCH on cell 2 are counted in cell 2, the BDs/CCEs of the multi-cell scheduling PDCCH on cell 3 are counted in cell 3, the BDs/CCEs of the multi-cell scheduling PDCCH on cell 4 are counted in cell 4, the BDs/CCEs of the multi-cell scheduling PDCCH on cell 5 are counted in cell 5. For the scheduled cell 5, the scheduling cells include cells 1-5. The splitting factors may be configured as (0, 0, 0, 0, 1) because cell 5 is also scheduling cell. Likewise, for the scheduled cell 4, the scheduling cells include cells 1-4. The splitting factors may be configured as (0, 0, 0, 1) because cell 4 is also scheduling cell. Likewise, for the scheduled cell 3, the scheduling cells include cells 1-3. The splitting factors may be configured as (0, 0, 1) because cell 3 is also scheduling cell. Likewise, for the scheduled cell 2, the scheduling cells include cells 1-2. The splitting factors may be configured as (0, 1) because cell 2 is also scheduling cell is the only scheduling cell, so no split is needed. For the scheduled cell 1, the only scheduling cell is also cell 1. No split is needed.

Assuming that the SCSs for the 5 cells are 15 kHz, 15 kHz, 30 kHz, 30 kHz, and 30 kHz. With such splitting in counting the number of cells for each SCS, the following may be derived based on Formulae (1) and (2):

$$M_{PDCCH}^{total,slot,15\ kHz} = \text{floor}(4*44*(1+1+0+0+0)/5) = \text{floor}(4*44*2/5) = 70 \text{ per 1 ms slot;}$$

$$M_{PDCCH}^{total,slot,30\ kHz} = \text{floor}(4*36*[0+0+1+1+1]/5) = \text{floor}(4*36*3/5) = 86 \text{ per 0.5 ms slot;}$$

The cell count portions above each contains 5 parts. Each part corresponds to one of the 5 scheduled cells. Each scheduled cell is associated with a set of split factors for its scheduling cells. The manner in which each part is determined is similar to the other examples described above.

Finally, to summarize, the disclosure above provides various schemes for using more than one scheduling cell to schedule more than one scheduled cell using single multi-cell scheduling DCI. In some implementations, the scheduled cell by a scheduling cell can be a scheduling cell to schedule its scheduling cell. In some implementations of multi-cell scheduling, cross scheduling with each other is not permitted.

For BD/CCE handling based on the counting scheme 1 above, BDs/CCEs are counted for each scheduled cell (in each scheduled cell corresponding USS on scheduling cell). The methods to reduce BD/CCE budget/capability include defining the maximum number of scheduling cells for a scheduled cell (method 1) and keeping the base BD/CCE unchanged but use configured/defined BD/CCE scaling factor of each scheduling cell for the same scheduled cell (method 2).

For BD/CCE handling based on the counting scheme 2 above, BDs/CCEs are counted for only for one scheduled cell (in the one scheduled cell USS). With some additional rules, the BD/CCE budget can be maintained. Under Rule 1, BD/CCE for the single multi-cell scheduling DCI is counted in the scheduling cell. Under Rule 2, for each scheduling cell, one scheduled cell with lowest index is selected, exclude the cell with corresponding index smaller than the index of the scheduling cell (assuming BDs/CCEs for multi-cell scheduling are counted in self-scheduling cell). Under Rule 3, BDs/CCEs for the single multi-cell scheduling DCI are counted in the (configured) scheduled cell with lowest index. Under Rule 4, BDs/CCEs for the single multi-cell scheduling DCI are counted in the scheduled cell with configured index, and one scheduled cell is only counted once.

For CA scaling, and in general, for a scheduled cell that is also a scheduling cell and can be scheduled by N scheduling cells, the CA split factors of the N scheduling cells with respect to the scheduled cell may be used/configured for the scheduled cell, with each split factor corresponding to each of the N scheduling cell to count the scheduled cell number. The number of split factors is equal to N. In some example implementations, the sum of all split factors is 1. In some other implementations, one of the split factors is 1.

For a scheduled cell that is only a scheduled cell and can be scheduled by N scheduling cells, split factors are used/configured for the scheduled cell with each split factor corresponding to each scheduling cell to count the scheduled cell number. The number of split factors is equal to N. Optional, the sum of all split factors may be 1. Optional, one of the split factors may be 1.

As such, in the implementations of the disclosure herein, the multi-cell scheduling can be performed/configured together for control overhead reduction using single multi-cell scheduling DCI. In case a scheduled cell can be configured with multiple scheduling cells, the multi-cell scheduling can be provided more flexible to select one cell to send the multi-cell scheduling PDCCH, and the UE complexity may not be increased with the various implementations and rules above.

Embodiment A1

An example embodiment of this disclosure may further allow a UE to support, and be configured with two overlapping Cell-Reference-Signal (CRS) rate matching patterns regardless of support or configuration of multiple Transmission/Reception Point (MTRP) (Transmission/Reception Point), with the motivation on improvement of NR (New Radio) spectrum efficiency for LTE-NR co-existence.

According to the current Rel-16 specifications TS 38.214 and TS 38.331, more than one semi-statically configured CRS rate matching patterns in a certain frequency range, i.e. more than one overlapping CRS patterns in frequency domain, is not supported if PDSCH transmission scheme is not multi-DCI based MTRP. For example, TS 38.214 Clause 5.1.4.2 specifies:

[Citation Begins]

A UE may be configured with any of the following higher layer parameters:

REs indicated by the 'RateMatchPatternLTE-CRS' in lte-CRS-ToMatchAround in ServingCellConfig or ServingCellConfigCommon configuring cell-specific RS, in 15 kHz subcarrier spacing applicable only to 15 kHz subcarrier spacing PDSCH, of one LTE carrier in a serving cell are declared as not available for PDSCH.

REs indicated by 'RateMatchPatternLTE-CRS' in lte-CRS-PatternList1-r16 in ServingCellConfig configuring cell-specific RS, in 15 kHz subcarrier spacing applicable only to 15 kHz subcarrier spacing PDSCH, of one LTE carrier in a serving cell are declared as not available for PDSCH.

Each RateMatchPatternLTE-CRS configuration contains v-Shift consisting of LTE-CRS-vshift(s), nrofCRS-Ports consisting of LTE-CRS antenna ports 1, 2 or 4 ports, carrierFreqDL representing the offset in units of 15 kHz subcarriers from (reference) point A to the LTE carrier centre subcarrier location, carrierBandwidthDL representing the LTE carrier bandwidth, and may also configure mbsfn-SubframeConfigList representing MBSFN subframe configuration. A UE determines the CRS position within the slot according to Clause 6.10.1.2 in [15, TS 36.211], where slot corresponds to LTE subframe.

If the UE is configured by higher layer parameter PDCCH-Config with two different values of coresetPoolIndex in ControlResourceSet and is also configured by the higher layer parameter lte-CRS-PatternList1-r16 and lte-CRS-PatternList2-r16 in ServingCellConfig, the following REs are declared as not available for PDSCH:

if the UE is configured with crs-RateMatch-PerCoresetPoolIndex, REs indicated by the CRS pattern(s) in lte-CRS-PatternList1-r16 if the PDSCH is associated with coresetPoolIndex set to '0', or the CRS pattern(s) in lte-CRS-PatternList2-r16 if PDSCH is associated with coresetPoolIndex set to '1';

otherwise, REs indicated by lte-CRS-PatternList1-r16 and lte-CRS-PatternList2-r16, in ServingCellConfig.

[Citation Ends]

For example, TS 38.331 recites:

[Citation begins]

```
ServingCellConfig ::=              SEQUENCE {
...
    lte-CRS-PatternList1-r16           SetupRelease { LTE-CRS-PatternList-
r16 }                                OPTIONAL,   -- Need M
    lte-CRS-PatternList2-r16           SetupRelease { LTE-CRS-PatternList-
r16 }                                OPTIONAL,   -- Need M
...
```

lte-CRS-PatternList1

A list of LTE CRS patterns around which the UE shall do rate matching for PDSCH. The LTE CRS patterns in this list shall be non-overlapping in frequency. The network does not configure this field and lte-CRS-ToMatchAround simultaneously.

lte-CRS-PatternList2

A list of LTE CRS patterns around which the UE shall do rate matching for PDSCH scheduled with a DCI detected on a CORESET with CORESETPoolIndex configured with 1. This list is configured only if CORESETPoolIndex configured with 1. The first LTE CRS pattern in this list shall be fully overlapping in frequency with the first LTE CRS pattern in lte-CRS-PatternList1, The second LTE CRS pattern in this list shall be fully overlapping in frequency with the second LTE CRS pattern in lte-CRS-PatternList1, and so on. Network configures this field only if the field lte-CRS-ToMatchAround is not configured and there is at least one ControlResourceSet in one DL BWP of this serving cell with coresetPoolIndex set to 1.

[Citation Ends]

Hence, the second bullet in the WID as shown in Section 1 is added to support two overlapping CRS rate matching patterns for single-TRP or single-DCI based MTRP PDSCH transmission.

Figure 13:
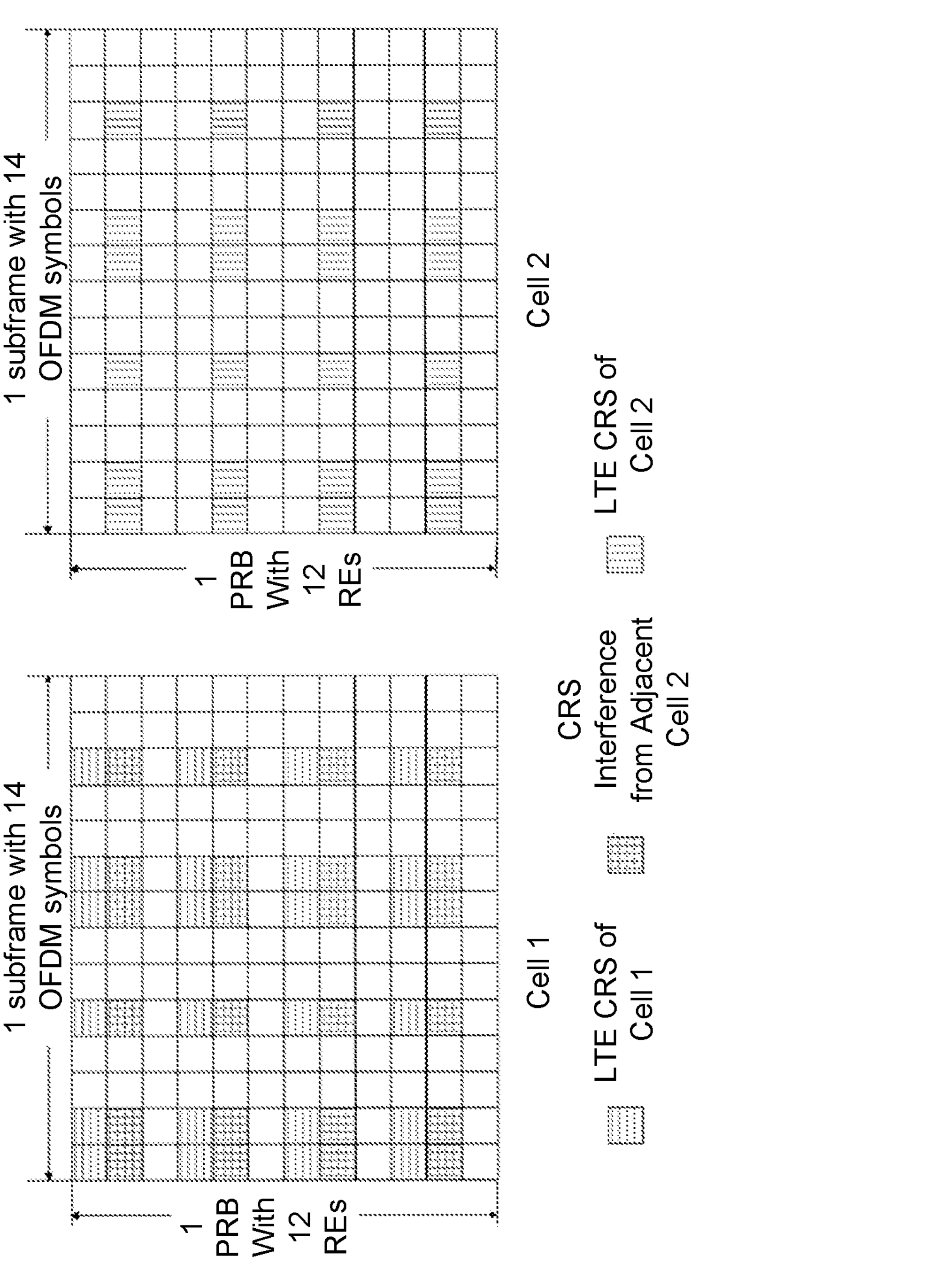
FIG. 13 illustrates interference caused by Cell-Reference-Signal (CRS) from two LTE cells.

As shown in FIG. 13, for UEs at the cell edge which may suffer serious interference from LTE CRS transmitted in two cells, it is beneficial to support two overlapping CRS rate matching patterns from RAN1/2 specification perspective regardless of whether the PDSCH transmission scheme is multi-DCI based MTRP, single-DCI based MTRP or single-TRP.

As shown in FIG. 13, for a UE configured with two CRS rate matching patterns, UE should do rate matching around REs indicated by both CRS patterns. For a UE only configured with a single CRS rate matching pattern, UE should do rate matching around REs indicated by the single CRS pattern.

In some implementations, the two CRS rate matching patterns are in a certain frequency range or overlapping in frequency, and optionally belong to two LTE CRS pattern lists respectively, e.g. lte-CRS-PatternList1, lte-CRS-PatternList2.

The benefit of this embodiment includes: Rate matching around REs indicated by both CRS patterns can mitigate the serious interference from both LTE cells. With the semi-static configured two CRS patterns, it is simple that UE will always do the rate matching around REs indicated by both CRS patterns.

Additional Embodiment A2

As shown in FIG. 13, for a UE configured with two CRS rate matching patterns, the UE could do rate matching around REs indicated by both CRS patterns or one of the CRS patterns dynamically. Optionally, 1 bit in DCI is used to to indicate whether rate matching is around the first pattern or both patterns. Optionally, 1 bit in DCI is used to indicate whether rate matching is around the first pattern or the second pattern. Optionally, 1 bit in DCI is used to indicate whether rate matching is around the second pattern or both patterns. Optionally, 2 bits in DCI are used to indicate whether rate matching is around the first pattern, the second pattern, both patterns or none of them. For example of using 1 bit in DCI to indicate whether rate matching is around the first pattern or the second pattern, when a UE moves to cell center, 1 bit in DCI is used to indicate rate matching around the first pattern because the inter-cell interference is small. When a UE moves to cell edge, 1 bit in DCI is used to indicate rate matching around the both pattern because the inter-cell interference is serious.

Optionally, above DCI can be replaced by MAC CE to dynamically change the used CRS rate matching patterns.

For a UE only configured a single CRS rate matching pattern, UE should do rate matching around REs indicated by the single CRS pattern.

In some implementations the two CRS rate matching patterns are in a certain frequency range or overlapping in frequency, and optionally belong to two LTE CRS pattern lists respectively, e.g. lte-CRS-PatternList1, lte-CRS-PatternList2.

Benefit: Rate matching around REs indicated by both CRS patterns can mitigate the serious interference from both LTE cells. With the semi-static configured two CRS patterns, it is more flexible and efficient that UE could do the rate matching around REs indicated by one or both CRS patterns depended on whether the inter-cell interference is serious or not.

Additional Embodiment A3

As shown in FIG. 13, for a UE configured with two CRS rate matching patterns, UE should do rate matching around REs indicated by both CRS patterns. For a UE only configured a single CRS rate matching pattern, UE should do rate matching around REs indicated by the single CRS pattern. In case PDCCH reception in symbols with LTE CRS RES is also supported by a UE, PDCCH reception in symbols with LTE CRS REs with two overlapping CRS rate matching patterns configured can be performed by one of following:

Option 1: PDCCH reception in symbols with LTE CRS REs which comprise the REs from the two overlapping CRS rate matching patterns.

Option 2: PDCCH reception in symbols with LTE CRS REs which comprise the REs from only one of the two overlapping CRS rate matching patterns. Optionally, the first CRS pattern which belong to lte-CRS-PatternList1.

Option 3: PDCCH reception in symbols with LTE CRS REs which comprise the REs from the two overlapping CRS rate matching patterns or only one of the two overlapping CRS rate matching patterns (optionally the first CRS pattern) is determined by a higher layer parameter or MAC CE or DCI.

Option 4: For single TRP case or single-DCI based multi-TRP case, any one of above three options can be applied. Take using option 1 as an example, that is to puncture NR PDCCH by all the REs indicated by both two overlapping CRS rate matching patterns. For multi-DCI based multi-TRP case, either applying the same rule as other cases (single TRP case or single-DCI based multi-TRP case) or applying the following option 5.

Option 5: Whether to only use the REs is indicated by lte-CRS-PatternList1-r16 or both lte-CRS-PatternList1-r16 and lte-CRS-PatternList2-r16 depends on a RRC parameter crs-RateMatch-PerCoresetPoolIndex. That is if the UE is configured by higher layer parameter PDCCH-Config with two different values of coresetPoolIndex in ControlResourceSet and is also configured by the higher layer parameter lte-CRS-PatternList1-r16 and lte-CRS-PatternList2-r16 in ServingCellConfig, the following REs are declared as not available for PDSCH: if the UE is configured with crs-RateMatch-PerCoresetPoolIndex, REs indicated by the CRS pattern(s) in lte-CRS-PatternList1-r16 if the PDSCH is associated with coresetPoolIndex set to '0', or the CRS pattern(s) in lte-CRS-PatternList2-r16 if PDSCH is associated with coresetPoolIndex set to '1'; otherwise, REs indicated by lte-CRS-PatternList1-r16 and lte-CRS-PatternList2-r16, in ServingCellConfig.

In some implementations, the two CRS rate matching patterns are in a certain frequency range or overlapping in frequency, and optionally belong to two LTE CRS pattern lists respectively, e.g. lte-CRS-PatternList1, lte-CRS-PatternList2.

Benefit: Rate matching around REs indicated by both CRS patterns can mitigate the serious interference from both LTE cells. With the semi-static configured two CRS patterns, it is simple that UE will always do the rate matching around REs indicated by both CRS patterns. For PDCCH reception, it is also benefit to consider the CRS from both LTE cells in case the interference is serious.

Additional Embodiment A4

As shown in FIG. 13, for a UE configured with two CRS rate matching patterns, UE could do rate matching around REs indicated by both CRS patterns or one of the CRS patterns dynamically. Optionally, using 1 bit in DCI to indicate whether rate matching around the first pattern or both patterns. Optionally, using 1 bit in DCI to indicate whether rate matching around the first pattern or the second pattern. Optionally, using 1 bit in DCI to indicate whether rate matching around the second pattern or both patterns. Optionally, using 2 bit in DCI to indicate whether rate matching around the first pattern, the second pattern, both patterns or none of them. For example of using 1 bit in DCI to indicate whether rate matching around the first pattern or the second pattern, when a UE moves to cell center, using 1 bit in DCI to indicate rate matching around the first pattern because the inter-cell interference is small. When a UE moves to cell edge, using 1 bit in DCI to indicate rate matching around the both pattern because the inter-cell interference is serious.

Optionally, above DCI can be replaced by MAC CE to dynamically change the used CRS rate matching patterns.

For a UE only configured a single CRS rate matching pattern, UE should do rate matching around REs indicated by the single CRS pattern.

In case PDCCH reception in symbols with LTE CRS REs is also supported by a UE, PDCCH reception in symbols with LTE CRS REs with two overlapping CRS rate matching patterns configured can be performed by one of following:

Option 1: PDCCH reception in symbols with LTE CRS REs which comprise the REs from the two overlapping CRS rate matching patterns.

Option 2: PDCCH reception in symbols with LTE CRS REs which comprise the REs from only one of the two overlapping CRS rate matching patterns. Optionally, the first CRS pattern which belong to lte-CRS-PatternList1 is used.

Option 3: PDCCH reception in symbols with LTE CRS REs which comprise the REs from the two overlapping CRS rate matching patterns or only one of the two overlapping CRS rate matching patterns (optionally the first CRS pattern) is determined by a higher layer parameter or MAC CE or DCI.

Option 4: For single TRP case or single-DCI based multi-TRP case, any one of above three options can be applied. Take using option 1 as an example, that is to puncture NR PDCCH by all the REs indicated by both two overlapping CRS rate matching patterns. For multi-DCI based multi-TRP case, either applying the same rule as other cases (single TRP case or single-DCI based multi-TRP case) or applying the following option 5.

Option 5: Whether to only use the REs indicated by lte-CRS-PatternList1-r16 or both lte-CRS-PatternList1-r16 and lte-CRS-PatternList2-r16 depends on a RRC parameter crs-RateMatch-PerCoresetPoolIndex. That is if the UE is configured by higher layer parameter PDCCH-Config with two different values of coresetPoolIndex in ControlResourceSet and is also configured by the higher layer parameter lte-CRS-PatternList1-r16 and lte-CRS-PatternList2-r16 in ServingCellConfig, the following REs are declared as not available for PDSCH: if the UE is configured with crs-RateMatch-PerCoresetPoolIndex, REs indicated by the CRS pattern(s) in lte-CRS-PatternList1-r16 if the PDSCH is associated with coresetPoolIndex set to '0', or the CRS pattern(s) in lte-CRS-PatternList2-r16 if PDSCH is associated with coresetPoolIndex set to '1'; otherwise, REs indicated by lte-CRS-PatternList1-r16 and lte-CRS-PatternList2-r16, in ServingCellConfig.

Optionally, the MAC CE or DCI above for two features (dynamically change the used CRS rate matching patterns, dynamically change the PDCCH reception in symbols with LTE CRS REs) is a same MAC CE or DCI.

In some implementations, the two CRS rate matching patterns are in a certain frequency range or overlapping in frequency, and optionally belong to two LTE CRS pattern lists respectively, e.g. lte-CRS-PatternList1, lte-CRS-PatternList2.

Benefit: Rate matching around REs indicated by both CRS patterns can mitigate the serious interference from both LTE cells. With the semi-static configured two CRS patterns, it is more flexible and efficient that UE could do the rate matching around REs indicated by one or both CRS patterns depended on whether the inter-cell interference is serious or not. Similar for the PDCCH reception in symbols with LTE CRS REs from the two overlapping CRS rate matching patterns.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method performed by a wireless terminal device in communication with a base station via a first Radio Access Technology (RAT), comprising:

supporting reception of a Physical Downlink Control Channel (PDCCH) candidate in symbols with wireless resources of a second RAT; and receiving the PDCCH candidate under a rule that Resource Elements (REs) of the PDCCH candidate overlap with only one of two wireless resource rate-matching pattern lists configurable to the wireless terminal device, wherein wireless resources indicated by any one of the two wireless resource rate-matching pattern lists are used by the second RAT.

2. The method of claim 1, wherein the two wireless resource rate-matching pattern lists comprises a first wireless resource rate-matching pattern list and a second wireless resource rate-mating pattern list.

3. The method of claim 2, wherein the first wireless resource rate-matching pattern list and the second wireless resource rate-matching pattern list overlap in frequency.

4. The method of claim 3, wherein the only one of the two wireless resource rate-matching pattern lists corresponds to the first wireless resource rate-matching pattern list.

5. The method of claim 3, wherein the only one of the two wireless resource rate-matching pattern lists corresponds to the second wireless resource rate-matching pattern list.

6. The method of claim 1, further comprising performing rate matching according to one of or both of the two wireless resource rate-matching pattern lists.

7. The method of claim 2, wherein the only one of the two wireless resource rate-matching pattern lists is indicated by a Downlink Control Information (DCI) message or a Media Access Control (MAC) Control Element (MAC CE) signaled from the base station.

8. The method of claim 1, further comprising performing rate matching according to one or both of the two wireless resource rate-matching pattern lists when receiving a Physical Downlink Shared Channel (PDSCH) scheduled by a DCI of the first RAT.

9. The method of claim 1, further comprising performing rate matching dynamically, when receiving a PDSCH scheduled by a DCI of the first RAT, according to one of or both of the two wireless resource rate-matching pattern lists as indicated by the DCI of the first RAT.

10. A wireless terminal device, in communication with a base station via a first Radio Access Technology (RAT), comprising a memory for storing instructions and a processor for executing the instructions to:

support reception of a Physical Downlink Control Channel (PDCCH) candidate in symbols with wireless resources of a second RAT; and receive the PDCCH candidate under a rule that Resource Elements (REs) overlap with only one of two wireless resource rate-matching pattern lists configurable to the wireless terminal device, wherein wireless resources indicated by any one of the two wireless resource rate-matching pattern lists are used by the second RAT.

11. The wireless terminal device of claim 10, wherein the two wireless resource rate-matching pattern lists comprises a first wireless resource rate-matching pattern list and a second wireless resource rate-mating pattern list.

12. The wireless terminal device of claim 11, wherein the first wireless resource rate-matching pattern list and the second wireless resource rate-matching pattern list overlap in frequency.

13. The wireless terminal device of claim 12, wherein the only one of the two wireless resource rate-matching pattern lists corresponds to the first wireless resource rate-matching pattern list.

14. The wireless terminal device of claim 12, wherein the only one of the two wireless resource rate-matching pattern lists corresponds to the second wireless resource rate-matching pattern list.

15. The wireless terminal device of claim 12, wherein the processor is further configured to execute the instructions to perform rate matching according to one of or both of the two wireless resource rate-matching pattern lists.

16. The wireless terminal device of claim 11, wherein the only one of the two wireless resource rate-matching pattern lists is indicated by a Downlink Control Information (DCI) message or a Media Access Control (MAC) Control Element (MAC CE) signaled from the base station.

17. The wireless terminal device of claim 10, the processor further configured to execute the instructions to perform rate matching according to one or both of the two wireless resource rate-matching pattern lists when receiving a Physical Downlink Shared Channel (PDSCH) scheduled by a DCI of the first RAT.

18. The wireless terminal device of claim 10, the processor further configured to execute the instructions to perform rate matching dynamically, when receiving a PDSCH scheduled by a DCI of the first RAT, according to the one of or both of the two wireless resource rate-matching pattern lists as indicated by the DCI of the first RAT.

19. A non-transitory computer-readable medium for storing instructions, the instructions, when being executed by a processor of a wireless terminal device in communication with a base station via a first Radio Access Technology (RAT), are configured to cause the wireless terminal device to:

support reception of a Physical Downlink Control Channel (PDCCH) candidate in symbols with wireless resources of a second RAT; and receive the PDCCH candidate under a rule that Resource Elements (REs) overlap with only one of two wireless resource rate-matching pattern lists configurable to the wireless terminal device, wherein wireless resources indicated by any one of the two wireless resource rate-matching pattern lists are used by the second RAT.

20. The non-transitory computer-readable medium of claim 19, wherein the two wireless resource rate-matching pattern lists comprise a first wireless resource rate-matching pattern list and a second wireless resource rate-mating pattern list, or wherein the instructions, when being executed by the processor, are further configured to cause the wireless terminal device to perform rate matching dynamically according to the one of or both of the two wireless resource rate-matching pattern lists as indicated by Downlink Control Information of the first RAT.

* * * * *